(12) United States Patent
Jeong et al.

(10) Patent No.: US 11,036,061 B2
(45) Date of Patent: *Jun. 15, 2021

(54) REFLECTING MODULE FOR OPTICAL IMAGE STABILIZATION AND CAMERA MODULE INCLUDING THE SAME

(71) Applicant: Samsung Electro-Mechanics Co., LTD., Suwon-si (KR)

(72) Inventors: Bong Won Jeong, Suwon-si (KR); Young Bok Yoon, Suwon-si (KR); Sang Ho Seo, Suwon-si (KR); Ta Kyoung Lee, Suwon-si (KR); Ah Hyeon Im, Suwon-si (KR); Jae Kyung Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,961

(22) Filed: Jul. 12, 2019

(65) Prior Publication Data

US 2019/0331933 A1    Oct. 31, 2019

Related U.S. Application Data

(63) Continuation of application No. 15/809,423, filed on Nov. 10, 2017, now Pat. No. 10,394,046.

(30) Foreign Application Priority Data

Jun. 12, 2017 (KR) .................. 10-2017-0073169

(51) Int. Cl.
G02B 27/64 (2006.01)
H04N 5/225 (2006.01)
H04N 5/232 (2006.01)

(52) U.S. Cl.
CPC ......... G02B 27/646 (2013.01); H04N 5/2253 (2013.01); H04N 5/2254 (2013.01);
(Continued)

(58) Field of Classification Search
None
See application file for complete search history.

(56) References Cited

U.S. PATENT DOCUMENTS

| 5,956,529 A | 9/1999 | Lee et al. |
| 5,959,758 A | 9/1999 | Seo |

(Continued)

FOREIGN PATENT DOCUMENTS

| CN | 101401023 A | 4/2009 |
| CN | 103646231 A | 3/2014 |

(Continued)

OTHER PUBLICATIONS

Chinese Office Action dated Jun. 23, 2020 in corresponding Chinese Patent Application No. 201810044193.9 (8 pages in English, 9 pages in Chinese).

(Continued)

Primary Examiner — Derek S. Chapel
(74) Attorney, Agent, or Firm — NSIP Law

(57) ABSTRACT

There are provided a reflecting module for optical image stabilization (OIS) and a camera module including the same. The reflecting module for OIS includes: a housing; a rotation holder supported by a sidewall of the housing through a rotation frame; a reflecting member provided on the rotation holder; a driving part providing driving force to the rotation holder so that the rotation holder is moved relative to the housing; and a pulling yoke provided in the housing so that the rotation holder is supported by the sidewall of the (Continued)

housing by attractive force between the pulling yoke and a magnet of the driving part provided on a lower surface of the rotation holder.

20 Claims, 23 Drawing Sheets

(52) U.S. Cl.
CPC ......... *H04N 5/2257* (2013.01); *H04N 5/2328* (2013.01); *H04N 5/23287* (2013.01)

(56) References Cited

U.S. PATENT DOCUMENTS

| | | | |
|---|---|---|---|
| 6,086,209 A | 7/2000 | Miyahara et al. | |
| 6,175,451 B1 | 1/2001 | Iriyama et al. | |
| 6,249,367 B1* | 6/2001 | Hirose | G02B 7/1821 |
| | | | 359/199.3 |
| 10,334,146 B2* | 6/2019 | Im | G06F 1/1605 |
| 10,394,046 B2* | 8/2019 | Jeong | G02B 27/646 |
| 10,416,473 B2* | 9/2019 | Lee | G02B 7/1821 |
| 2001/0021165 A1 | 9/2001 | Nakagishi | |
| 2006/0193067 A1* | 8/2006 | Kim | G02B 26/105 |
| | | | 359/872 |
| 2008/0169891 A1* | 7/2008 | Umeda | G02B 7/003 |
| | | | 335/229 |
| 2008/0252873 A1* | 10/2008 | Onojima | G01S 7/4814 |
| | | | 356/3 |
| 2009/0079275 A1 | 3/2009 | Someno et al. | |
| 2009/0122406 A1 | 5/2009 | Rouvinen et al. | |
| 2013/0063629 A1 | 3/2013 | Webster et al. | |
| 2013/0229698 A1 | 9/2013 | Honda et al. | |
| 2015/0002683 A1 | 1/2015 | Hu et al. | |
| 2015/0042870 A1 | 2/2015 | Chan et al. | |
| 2018/0109660 A1 | 4/2018 | Yoon et al. | |
| 2018/0224665 A1 | 8/2018 | Im et al. | |
| 2018/0231793 A1* | 8/2018 | Jeong | H02K 1/34 |
| 2018/0364450 A1 | 12/2018 | Lee et al. | |
| 2019/0361261 A1* | 11/2019 | Lee | H04N 5/2254 |
| 2020/0103673 A1* | 4/2020 | Lee | G02B 27/646 |
| 2020/0137274 A1* | 4/2020 | Lee | G02B 13/001 |
| 2020/0396358 A1* | 12/2020 | Park | G03B 17/14 |
| 2020/0404181 A1* | 12/2020 | Lee | G02B 7/182 |

FOREIGN PATENT DOCUMENTS

| | | |
|---|---|---|
| CN | 103676405 A | 3/2014 |
| CN | 106405991 A | 2/2017 |
| CN | 205942054 U | 2/2017 |
| EP | 3 163 352 A1 | 5/2017 |
| JP | 3852073 B2 | 11/2006 |
| JP | 2008-3130 A | 1/2008 |
| JP | 2015-11353 A | 1/2015 |
| JP | 2016-012042 A | 1/2016 |
| KR | 2003-0043873 A | 6/2003 |
| WO | WO 2007/091112 A1 | 8/2007 |

OTHER PUBLICATIONS

Korean Office Action dated Apr. 13, 2018 in the corresponding Korean Patent Application No. 10-2017-0073169 (8 pages in English, 6 pages in Korean).

* cited by examiner

I-I'

I-I'

I-I'

REFLECTING MODULE FOR OPTICAL IMAGE STABILIZATION AND CAMERA MODULE INCLUDING THE SAME

CROSS-REFERENCE TO RELATED APPLICATION(S)

This application is a continuation of U.S. application Ser. No. 15/809,423 filed on Nov. 10, 2017, now U.S. Pat. No. 10,394,046 issued on Aug. 27, 2019, which claims the benefit of priority under 35 USC § 119(a) to Korean Patent Application No. 10-2017-0073169 filed on Jun. 12, 2017, in the Korean Intellectual Property Office, the entire disclosures of which are incorporated herein by reference for all purposes.

BACKGROUND

1. Field

The description relates to a reflecting module for optical image stabilization (OIS) and a camera module including the same.

2. Description of Related Art

Recently, camera modules have been generally installed in portable electronic devices such as tablet personal computers (PCs), laptop computers, and the like, in addition to smartphones, and an auto-focusing function, an optical image stabilization (OIS) function, a zoom function, and the like, have been added to camera modules for mobile terminals.

However, in order to implement various functions, the structures of camera modules have become relatively complicated and the sizes of camera modules have increased, resulting in difficulty in mounting camera modules in portable electronic devices in which camera modules are to be mounted.

In addition, when a lens or an image sensor is directly moved for the purpose of optical image stabilization, both a weight of the lens or of the image sensor itself, and weights of other members to which the lens or the image sensor is attached, should be considered, and a certain level of driving force or more is thus required, resulting in increased power consumption.

SUMMARY

In one general aspect, a reflecting module for optical image stabilization (OIS) includes a housing, a rotation holder supported by a sidewall of the housing through a rotation frame, a reflecting member disposed on the rotation holder, a driving part configured to provide driving force to the rotation holder such that the rotation holder is moved relative to the housing, and a pulling yoke disposed in the housing so that the rotation holder is supported by the sidewall of the housing by attractive force between the pulling yoke and a magnet disposed on a lower surface of the rotation holder.

The rotation frame may be rotatable around one axis parallel to a reflecting surface of the reflecting member with respect to the housing, and the rotation holder may be rotatable around another axis parallel to the reflecting surface of the reflecting member and approximately perpendicular to the one axis with respect to the rotation frame.

The rotation frame may move together with the rotation holder when the rotation frame is rotated around the one axis, and the rotation holder may rotate relative to the rotation frame when the rotation holder is rotated around the other axis.

The rotation frame may surround an edge of the rotation holder and the rotation holder may be partially disposed on an edge of the rotation frame and be rotatable within the rotation frame.

A set of ball bearings aligned in the one axis direction may be disposed between an edge of the rotation frame and the sidewall of the housing.

Seating grooves into which the ball bearings are inserted may be disposed between the edge of the rotation frame and the sidewall of the housing.

A set of ball bearings aligned in the other axis direction may be disposed between the rotation holder and an edge of the rotation frame. Seating grooves into which the ball bearings are inserted may be disposed between the rotation holder and the edge of the rotation frame.

The ball bearings may be integral ball bearings provided integral with either one of the rotation frame, in the edge of the rotation frame, and the housing, in the sidewall of the housing, and seating grooves into which the integral ball bearings are disposed may be provided in the edge of one of the rotation frame and the sidewall of the housing in which the ball bearings are not provided.

The ball bearings may be integral ball bearings provided integral with either one of the rotation holder, in an edge of the rotation holder, and the rotation frame, in an edge of the rotation frame, and seating grooves into which the integral ball bearings are inserted may be provided in one of the edge of the rotation holder and the rotation frame in which the ball bearings are not provided.

The integral ball bearings may be any one of a spherical shape, a hemispherical shape, a semi-cylindrical shape, and a rounded protrusion shape.

The seating grooves provided in the edge of the rotation frame or the sidewall of the housing may have a round shape or a poly-pyramidal shape.

The integral ball bearings may be any one of a spherical shape, a hemispherical shape, a semi-cylindrical shape, and a rounded protrusion shape.

The seating grooves may be provided in the edge of the rotation holder or the rotation frame and may have a round shape or a poly-pyramidal shape.

In one general aspect, a camera module includes a lens module including lenses and a reflecting module for OIS disposed in front of the lens module and configured to change the path of incident light so that the light is directed toward the lens module. The optical axis of the lenses may be generally perpendicular to the direction of the incident light to the camera module. A portable electronic device may include the camera module.

BRIEF DESCRIPTION OF DRAWINGS

The above and other aspects, features, and advantages of the description will be more clearly understood from the following detailed description taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments of the present disclosure will now be described in detail with reference to the accompanying drawings.

Figure 1:
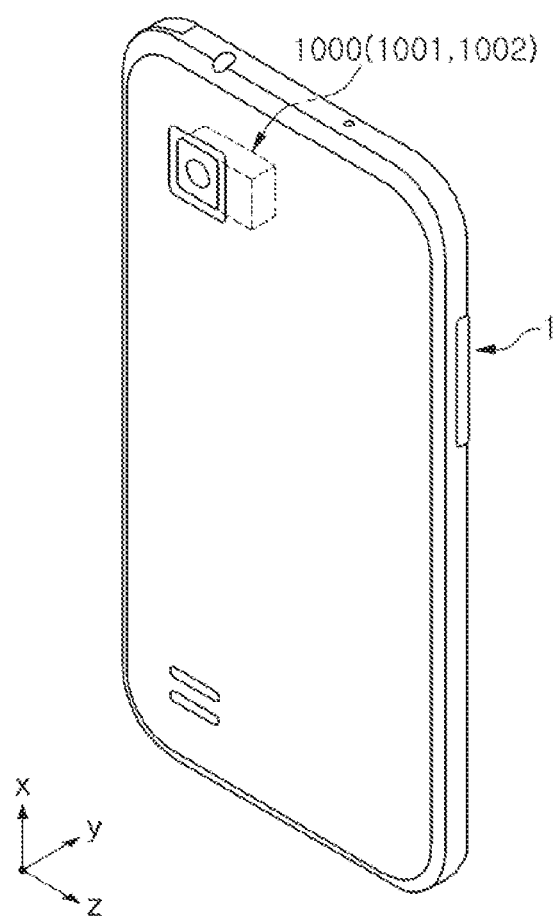
FIG. 1 is a perspective view illustrating a portable electronic device according to an embodiment in the present disclosure.

FIG. 1 is a perspective view of a portable electronic device according to an embodiment.

Referring to FIG. 1, a portable electronic device 1 according to an embodiment may be a portable electronic device such as a mobile communications terminal, a smartphone, a tablet personal computer (PC), or the like, in which a camera module 1000 is mounted.

As illustrated in FIG. 1, the portable electronic device 1 is provided with the camera module 1000 to capture an image of a subject.

In an embodiment, the camera module 1000 includes lenses, and the optical axis (a Z axis) of each of the lenses is directed in a direction perpendicular to a thickness direction (a Y-axis direction or a direction from a front surface of the portable electronic device to a rear surface thereof or an opposite direction to the direction from the front surface of the portable electronic device to the rear surface thereof) of the portable electronic device 1.

As an example, the optical axis (the Z axis) of each of the lenses included in the camera module 1000 is in a width or length direction of the portable electronic device 1 rather than the thickness direction of the portable electronic device 1 (as an example, a structure in which the lenses are stacked in the width direction is illustrated in FIG. 1).

Therefore, even though the camera module 1000 has functions including an auto-focusing (AF) function, a zoom function, an optical image stabilization (hereinafter, referred to as OIS) function, thickness of the portable electronic device 1 is not increased. Therefore, the portable electronic device 1 may be miniaturized.

The camera module 1000 according to an embodiment may have at least one of the AF function, the zoom function, and the OIS function.

Since the camera module 1000 including the AF function, the zoom function, the OIS function, and the like, needs to include various components, a size of the camera module is increased as compared to a general camera module.

When the size of the camera module 1000 is increased, a problem occurs in miniaturizing the portable electronic device 1 in which the camera module 1000 is mounted.

For example, when the number of stacked lenses in the camera module is increased for the purpose of the zoom function and stacked lenses are formed in the camera module in the thickness direction of the portable electronic device, thickness of the portable electronic device is increased, depending on the number of stacked lenses. Therefore, when the thickness of the portable electronic device is not increased, the number of stacked lenses may not be sufficiently secured, such that zoom performance deteriorates.

In addition, an actuator moving a lens group in an optical axis direction or a direction perpendicular to the optical axis needs to be installed in order to implement the AF function and the OIS function, and when the optical axis (the Z axis) of the lens group is in the thickness direction of the portable electronic device, the actuator moving the lens group needs also to be installed in the thickness direction of the portable electronic device. Therefore, thickness of the portable electronic device is increased.

However, in the camera module 1000 according to an embodiment, the optical axis (the Z axis) of each of the lenses is disposed perpendicularly to the thickness direction of the portable electronic device 1. Therefore, even though the camera module 1000 having the AF function, the zoom function, and the OIS function is mounted in the portable electronic device 1, the portable electronic device 1 is miniaturized.

Figure 2:
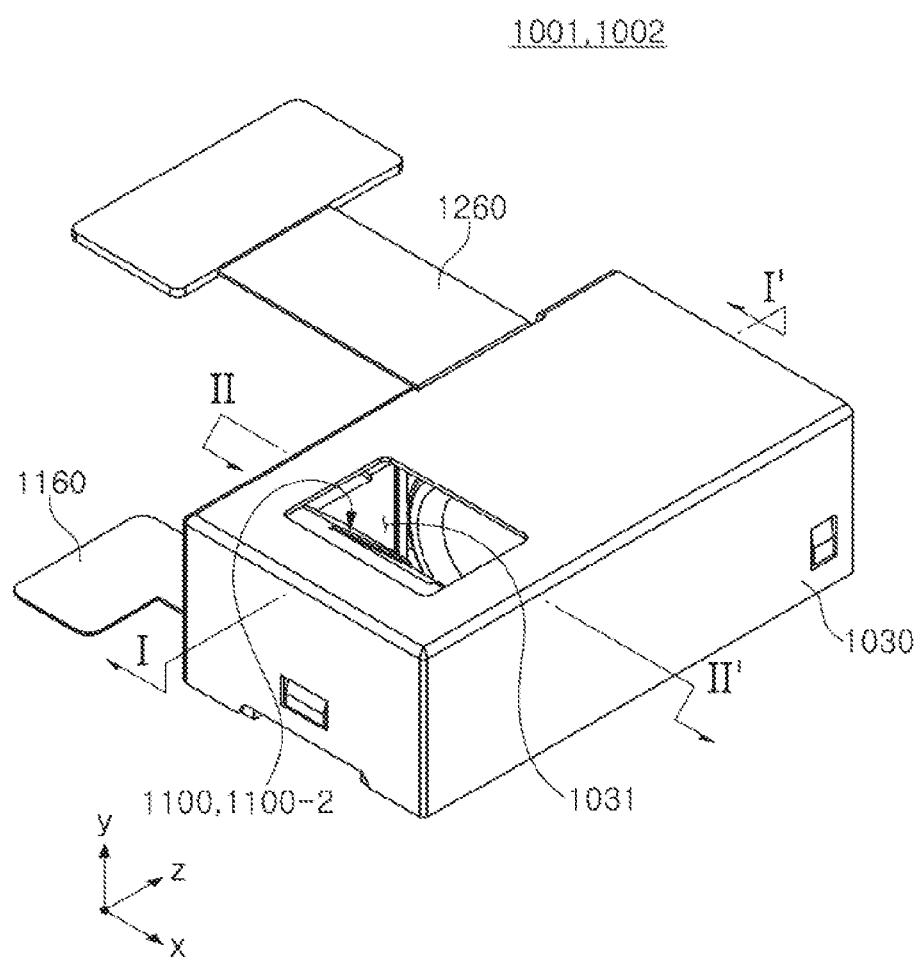
FIG. 2 is a perspective view illustrating a camera module according to an embodiment in the present disclosure.
Figure 3:
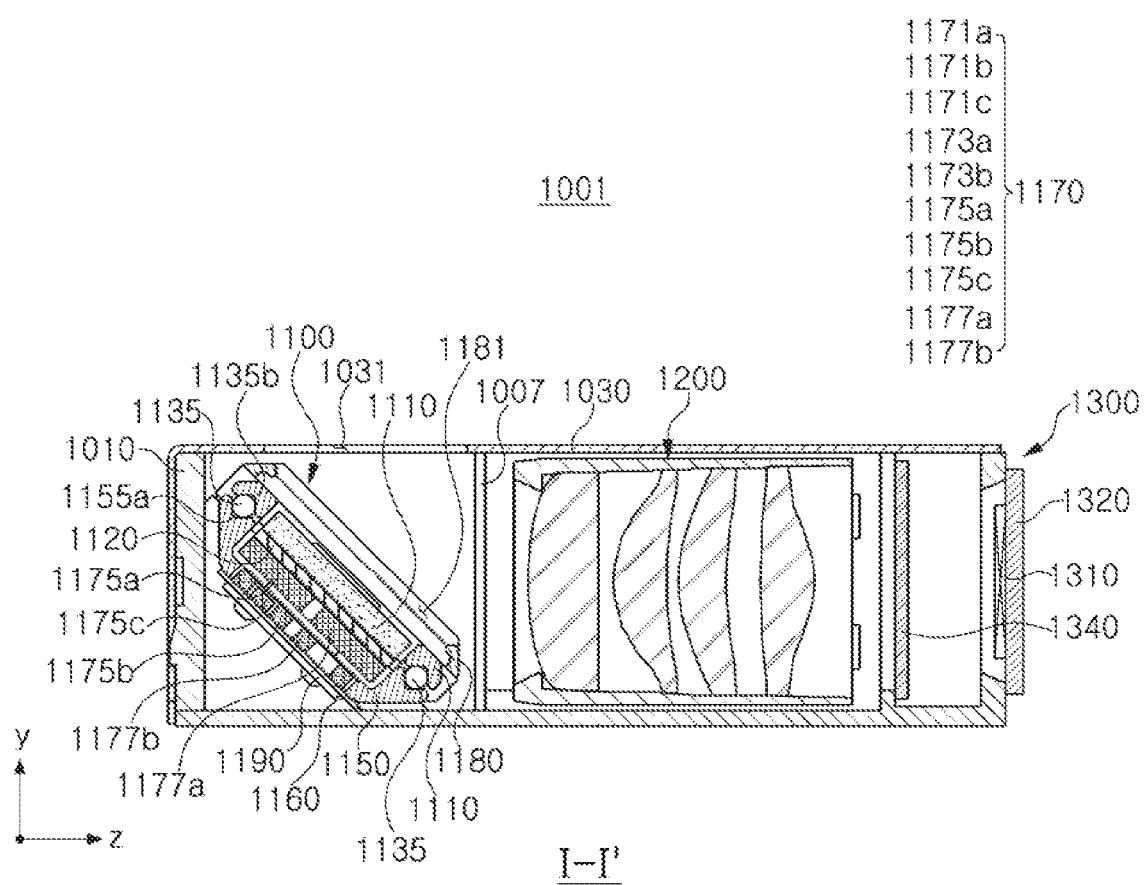
FIG. 3 is a cross-sectional view illustrating the camera module according to an embodiment in the present disclosure.

FIG. 2 is a perspective view of a camera module according to embodiments, and FIG. 3 is a cross-sectional view taken along line I-I' of the camera module according to an embodiment.

Referring to FIGS. 2 and 3, the camera module 1001 according to an embodiment includes a reflecting module 1100 for OIS (hereinafter, referred to as a 'reflecting module'), a lens module 1200, and an image sensor module 1300 in a case 1010.

The reflecting module 1100 changes the direction of light. As an example, the direction of light incident through an opening 1031 of a cover 1030 covering an upper portion of the camera module 1001 is changed by the reflecting module 1100 so that the light is directed toward the lens module 1200. To this end, the reflecting module 1100 includes the reflecting member 1110 reflecting the light. A path of the light incident to the reflecting module 1100 is changed by the reflecting member 1110.

Therefore, a path of the light incident through the opening 1031 is changed by the reflecting module 1100 so that the light is directed toward the lens module 1200. For example, a path of light incident in the thickness direction (the Y-axis direction) of the camera module 1001 may be changed by the reflecting module 1100 to coincide with the optical axis direction (a Z-axis direction).

The lens module 1200 includes lenses through which the light which direction has been changed by the reflecting module 1100 passes, and the image sensor module 1300 may include an image sensor 1310 converting the light passing through the lenses into an electrical signal and a printed circuit board 1320 on which the image sensor 1310 is mounted. In addition, the image sensor module 1300 may include an optical filter 1340 filtering the light incident from the lens module 1200 thereto. The optical filter 1340 may be an infrared cut-off filter.

In the case 1010, the reflecting module 1100 is provided in front of the lens module 1200, and the image sensor module 1300 is provided behind the lens module 1200.

Figure 4:
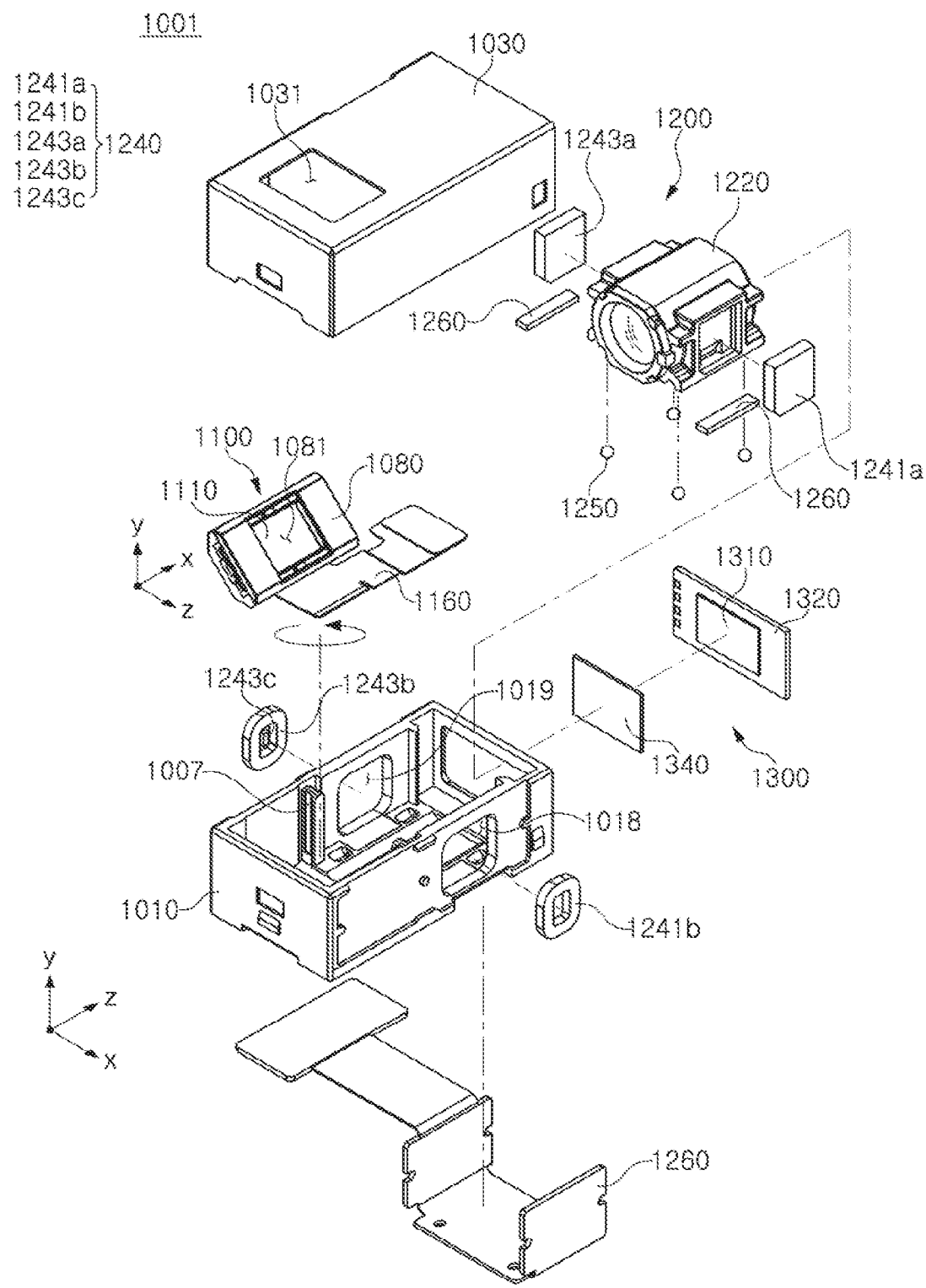
FIG. 4 is an exploded perspective view illustrating the camera module according to an embodiment in the present disclosure.
Figure 5:
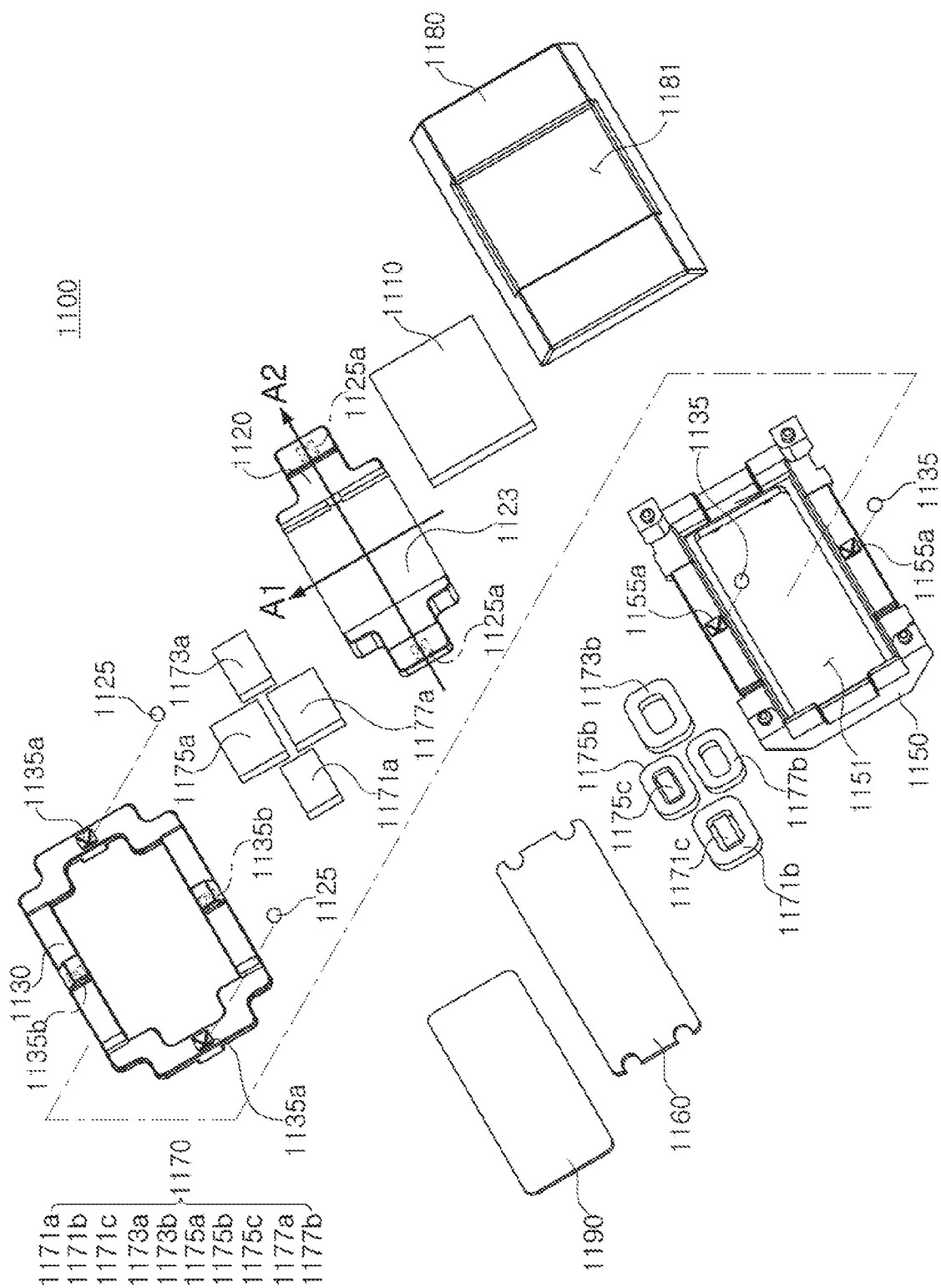
FIG. 5 is an exploded perspective view illustrating a reflecting module of the camera module according to an embodiment in the present disclosure.
Figure 6:
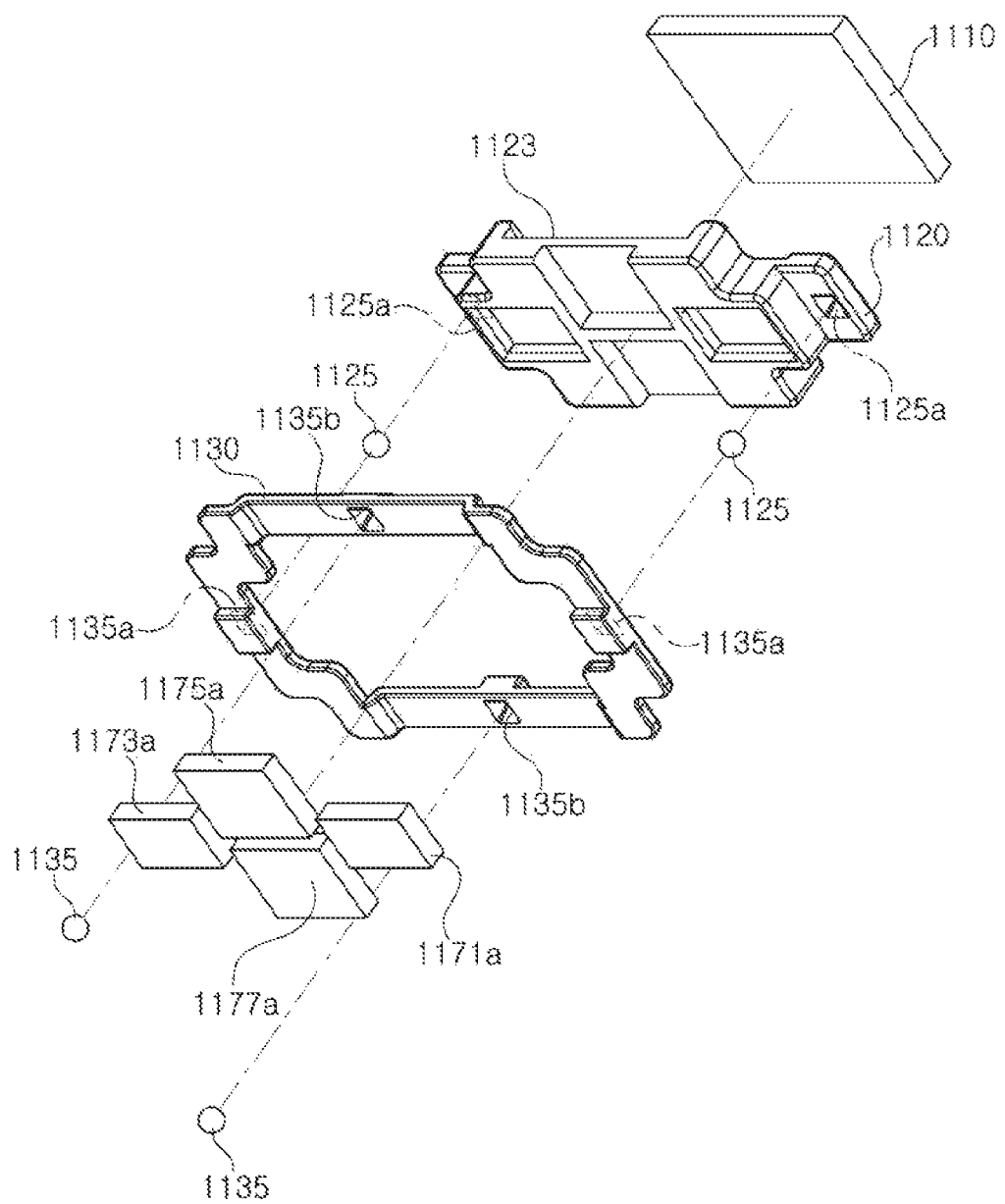
FIG. 6 is a bottom view illustrating a rotation frame and a rotation holder of the camera module according to an embodiment in the present disclosure.

FIG. 4 is an exploded perspective view of the camera module according to an embodiment, FIG. 5 is an exploded perspective view of a reflecting module of the camera module according to an embodiment, and FIG. 6 is a bottom view of a rotation frame and a rotation holder of the camera module according to an embodiment.

Referring to FIGS. 2 through 6, the camera module 1001 according to an embodiment includes the reflecting module 1100, the lens module 1200, and the image sensor module 1300 in the case 1010.

The case 1010 includes the reflecting module 1100, the lens module 1200, and the image sensor module 1300 sequentially provided from one side thereof to the other side thereof. The case 1010 has an internal space into which the reflecting module 1100, the lens module 1200, and the image sensor module 1300 are inserted (the image sensor module 1300 may be attached to an outer portion of the case 1010).

Here, as illustrated in the drawings, the case 1010 is entirely integrally provided so that both of the reflecting module 1100 and the lens module 1200 are inserted into the internal space of the case 1010. In addition, the case 1010 may be provided integrally with a housing 1150 of the reflecting member 1100, such that the other components of the reflecting module 1100 are in the case 1010 (in this example, the case 1010 and the housing 1150 are integrally formed). Alternatively, the reflecting module 1100 and the lens module 1200 may be separately provided, and are assembled and connected to each other to form the case 1010.

In addition, the case 1010 may be covered by the cover 1030 so that the internal space of the case 1010 is not viewed.

The cover 1030 has an opening 1031 through which light is incident, and a moving direction of the light incident through the opening 1031 is changed by the reflecting module 1100, such that the light is incident to the lens module 1200. The cover 1030 is integrally provided to cover the entire case 1010, or is provided as separate members each covering the reflecting module 1100 and the lens module 1200.

To this end, the reflecting module 1100 includes the reflecting member 1110 reflecting the light. In addition, the light incident to the lens module 1200 passes through the lenses and is then converted into and stored as an electrical signal by the image sensor 1310.

The case 1010 includes the reflecting module 1100 and the lens module 1200 disposed in the internal space thereof. Therefore, in the internal space of the case 1010, a space in which the reflecting module 1100 is disposed and a space in which the lens module 1200 is disposed may be distinguished from each other by protruding walls 1007 (however, the space in which the reflecting module 1100 is disposed and the space in which the lens module 1200 is disposed may be provided in one space without being separately distinguished from each other). In addition, the reflecting module 1100 may be provided in front of the protruding walls 1007, and the lens module 1200 may be provided behind the protruding walls 1007. The protruding walls 1007 may protrude from opposite sides of the case 1010 to the internal space.

In addition, the case 1010 includes a first driving part 1170 and a second driving part 1240 each provided in order to drive the reflecting module 1100 and the lens module 1200. The first driving part 1170 includes coils 1171b, 1173b, 1175b, and 1177b for driving the reflecting module 1100, and the second driving part 1240 includes coils 1241b and 1243b for driving the lens module 1200. In addition, the coils 1171b, 1173b, 1175b, 1177b, 1247 1241b, and 1243b are provided in the housing 1150 and the case 1010, respectively, in a state in which they are mounted on boards 1160 and 1260, respectively.

In addition, the housing 1150 is provided with a through-hole 1151 so that coils 1171b, 1173b, 1175b, and 1177b of the first driving part 1170 are exposed to an inner portion of the housing 1150, and are provided with through-holes 1018 and 1019 so that the coils 1241b and 1243b of the second driving part 1240 are exposed to the internal space in order to drive the case 1010.

In addition, the boards 1160 and 1260 on which the coils 1171b, 1173b, 1175b, 1177b, 1247 1241b, and 1243b are mounted may be flexible printed circuit boards (FPCBs) or rigid PCBs (RPCBs), and when the boards 1160 and 1260 are the FPCBs, reinforcing plates (not illustrated) may be provided on lower surfaces of the boards in order to reinforce rigidity of the boards.

The reflecting module 1100 changes the path of the light incident thereto through the opening 1031. When an image or a moving picture is captured, the image may be blurred or the moving picture may be shaken due to hand-shake, or the like, of a user. The reflecting module 1100 corrects the hand-shake of the user by moving a rotation holder 1120 on which the reflecting member 1110 is mounted. For example, when a shake is generated at the time of capturing the image or the moving picture due to the hand-shake, or the like, of the user, a relative displacement corresponding to the shake is provided to the rotation holder 1120 to compensate for the shake.

In addition, in an embodiment, the OIS function is implemented by the movement of the rotation holder 1120 having a relatively low weight due to absence of lenses and power consumption is thus significantly reduced.

That is, in an embodiment, the light in which the OIS is performed is incident to the lens module 1200 by changing the direction of the light by the movement of the rotation holder 1120 on which the reflecting member 1110 is provided without moving the lens barrel including the lenses or the image sensor in order to implement the OIS function.

The reflecting module 1100 includes the housing 1150, the reflecting member 1110, the rotation holder 1120 having the reflecting member 1110 mounted thereon and supported by a sidewall of the housing 1150 in a state in which a rotation frame 1130 is disposed therebetween, the board 1160 coupled to the housing 1150, and the first driving part 1170 including coils 1171b, 1173b, 1175b, and 1177b and hall sensors 1171c and 1175c provided on the board 1160, magnets 1171a, 1173a, 1175a, and 1177a are provided in the rotation holder 1120, and a pulling yoke 1190 is provided in the housing 1150 allowing the rotation holder 1120 to be supported by the sidewall of the housing 1150 by attractive force between the pulling yoke 1190 and the magnets 1171a, 1173a, 1175a, and 1177a. The pulling yoke 1190 is attached to a bottom surface of the board 1160, that is, the other surface of the board 1160 opposing one surface of the board 1160 on which the coils 1171b, 1173b, 1175b, and 1177b are mounted. The reflecting module includes a cover 1180 disposed on the housing 1150 and having an opening 1181 through which the reflecting member 1110 is exposed.

The reflecting member 1110 changes the direction of the light. For example, the reflecting member 1110 may be a mirror or a prism reflecting the light (a case in which the reflecting member 1110 is a mirror is illustrated in the drawings associated with an embodiment for convenience of explanation).

The reflecting member 1110 is fixed to the rotation holder 1120. The rotation holder 1120 has a mounted surface 1123 on which the reflecting member 1110 is mounted.

The mounted surface 1123 of the rotation holder 1120 is an inclined surface so that the path of the light is changed. For example, the mounted surface 1123 has an inclined surface inclined with respect to the optical axis (the Z axis) of each of the lenses by 45°. In addition, the inclined surface of the rotation holder 1120 is directed toward the opening 1031 of the cover 1030 through which the light is incident.

The rotation holder 1120 on which the reflecting member 1110 is mounted is movably accommodated in an internal space of the housing 1150. The rotation holder 1120 may be rotated around a first axis and a second axis in the housing 1150 by action of the first driving part 1170. Therefore, the OIS is performed. Here, the first axis A1 refers to one direction parallel to a reflecting surface of the reflecting member, and the second axis A2 refers to a direction parallel to the reflecting surface of the reflecting member and perpendicular to the first axis A1.

The rotation holder 1120 is supported by the sidewall of the housing 1150 in a state in which the rotation frame 1130 is disposed therebetween. In other words, the rotation holder 1120 is supported by one surface of the rotation frame 1130 so that a portion thereof is rotatable around the second axis A2, and the rotation frame 1130 is supported by the sidewall of the housing 1150 so that a portion thereof is rotatable around the first axis A1. In addition, the rotation holder 1120 is supported by the housing 1150 in a state in which the rotation frame 1130 is disposed therebetween by the attractive force between the magnets 1171a, 1173a, 1175a, and 1177a provided in the rotation holder 1120 and the pulling yoke 1190 provided in the housing 1150.

The rotation frame 1130 is moved together with the rotation holder 1120 when it is rotated around the first axis A1, and is relatively rotated with respect to the rotation frame 1130 (the rotation frame 1130 may not be rotated) when it is rotated around the second axis A2.

The rotation frame 1130 has a frame structure surrounding an edge of the rotation holder 1120, and the rotation holder 1120 is partially disposed on an edge of the rotation frame 1130 to be thus rotatable around the second axis A2 in the rotation frame 1130. Therefore, a set of ball bearings 1125 aligned in a second axis A2 direction are provided between the edge of the rotation frame 1130 and the rotation holder 1120. In addition, facing surfaces of the rotation frame 1130 and the rotation holder 1120 are provided, respectively, with seating grooves 1135a and 1125a into which the ball bearings 1125 are inserted. The seating grooves 1135a and 1125a may have a round shape or a poly-pyramidal shape.

In addition, the rotation frame 1130 is partially disposed on the housing 1150 and is rotatable around the first axis A1. Therefore, a set of ball bearings 1135 aligned in a first axis A1 direction are provided between the edge of the rotation frame 1130 and the housing 1150. In addition, facing surfaces of the rotation frame 1130 and the housing 1150 are provided, respectively, with seating grooves 1135b and 1155a into which the ball bearings 1135 are inserted. The seating grooves 1135b and 1155a may have a round shape or a poly-pyramidal shape.

The first driving part 1170 generates driving force so that the rotation holder 1120 is rotatable around two axes (the first axis A1 and the second axis A2). Therefore, the rotation holder 1120 may be moved so that an interval between the rotation holder 1120 and a bottom surface of the housing 1150 in each portion is changed.

As an example, the first driving part 1170 includes the magnets 1171a, 1173a, 1175a, and 1177a and the coils 1171b, 1173b, 1175b, and 1177b disposed to face the magnets 1171a, 1173a, 1175a, and 1177a.

When power is applied to the coils 1171b, 1173b, 1175b, and 1177b, the rotation holder 1120 in which the magnets 1171a, 1173a, 1175a, and 1177a are mounted are rotated around the first axis and the second axis by electromagnetic interaction between the magnets 1171a, 1173a, 1175a, and 1177a and the coils 1171b, 1173b, 1175b, and 1177b.

The magnets 1171a, 1173a, 1175a, and 1177a may be mounted in the rotation holder 1120. As an example, the plurality of magnets 1171a, 1173a, 1175a, and 1177a are mounted on a lower surface of the rotation holder 1120. In addition, the magnets 1175a and 1177a aligned in the first axis A1 direction or the magnets 1171a and 1173a aligned in the second axis A2 direction, of the magnets 1171a, 1173a, 1175a, and 1177a may be separated from each other or be integrated with each other (only an embodiment in which they are separated from each other is illustrated in the drawings).

The coils 1171b, 1173b, 1175b, and 1177b are mounted in the housing 1150. As an example, the plurality of coils 1171b, 1173b, 1175b, and 1177b are mounted in the housing 1150 through the board 1160. That is, the coils 1171b, 1173b, 1175b, and 1177b are on the board 1160, and the board 1160 may be mounted in the housing 1150. In addition, housing 1150 is provided with the through-hole 1151 so that the coils 1171b, 1173b, 1175b, and 1177b on the board 1160 attached to an outer surface of the housing 1150 are exposed to the internal space of the housing 1150.

The pulling yoke 1190 is mounted beneath the board 1160, as described above, and may also serve to reinforce strength of the board 1160.

In an embodiment, when the rotation holder 1120 is rotated, a closed loop control manner of sensing and feeding back a position of the rotation holder 1120 is used.

Therefore, position sensors 1171*c* and 1175*c* may be required in order to perform a closed loop control. The position sensors 1171*c* and 1175*c* may be hall sensors.

The position sensors 1171*c* and 1175*c* are disposed inside or outside the coils 1171*b* and 1175*b*, respectively, and are mounted on the board 1160 on which the coils 1171*b* and 1175*b* are mounted.

Meanwhile, the board 1160 may be provided with a gyro sensor (not illustrated) sensing a shake factor such as the hand-shake, or the like, of the user, and may be provided with a driver integrated circuit (IC) (not illustrated) providing driving signals to the coils 1171*b*, 1173*b*, 1175*b*, and 1177*b*.

Figure 7A:
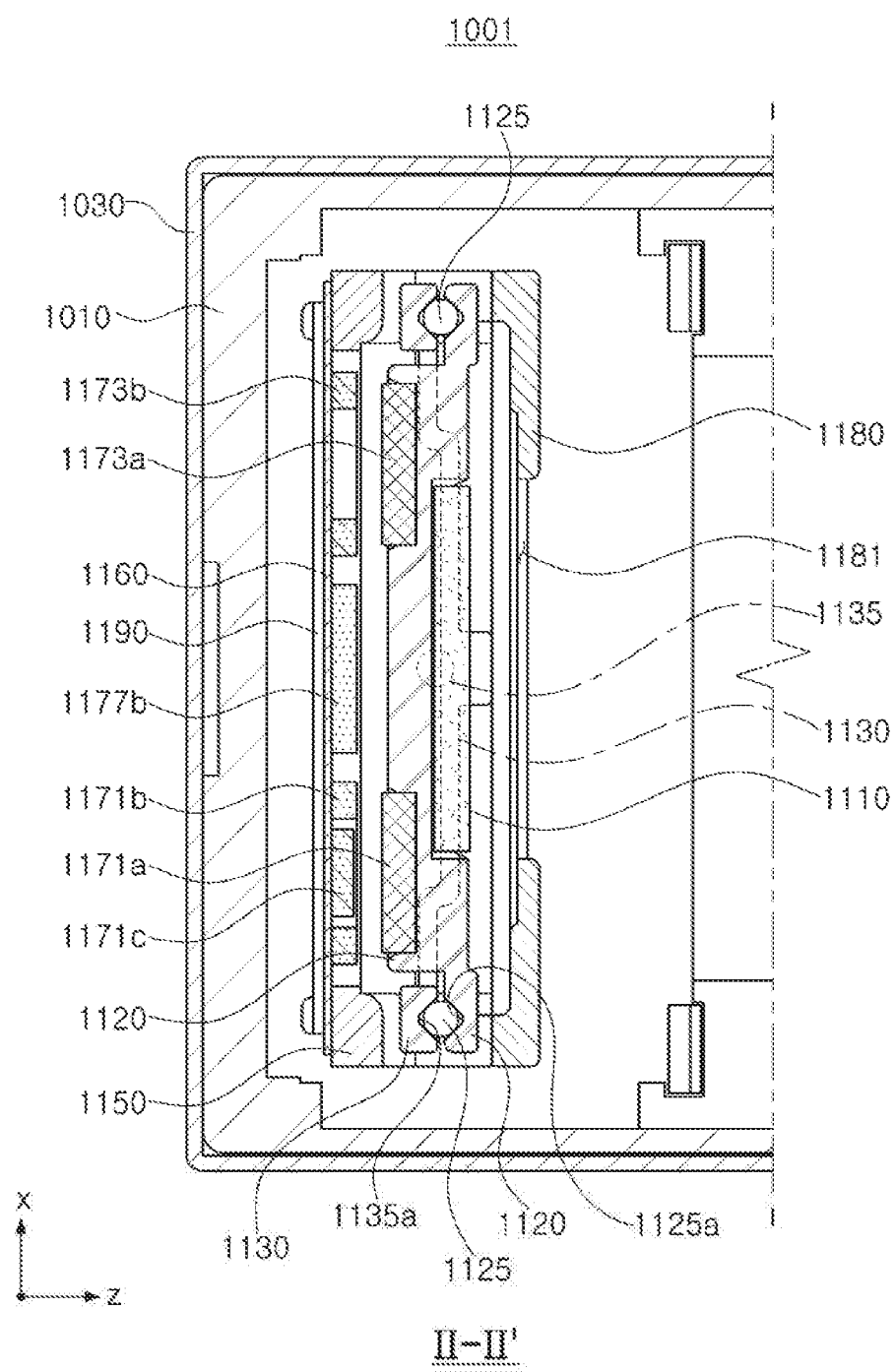
FIGS. 7A through 7C are schematic views illustrating a manner in which the rotation holder according to an embodiment in the present disclosure is rotated around a first axis.
Figure 7B:
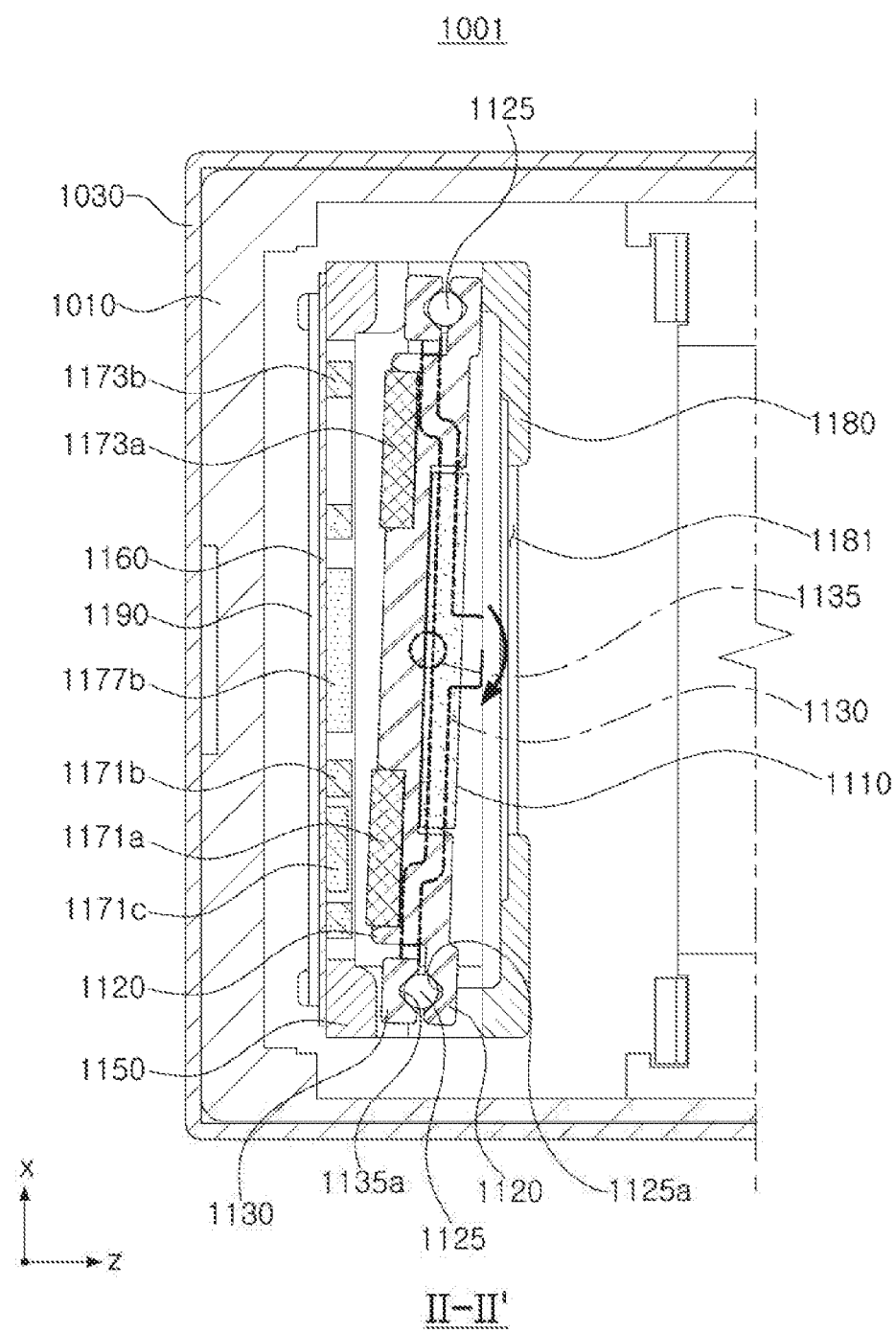
Figure 7C:
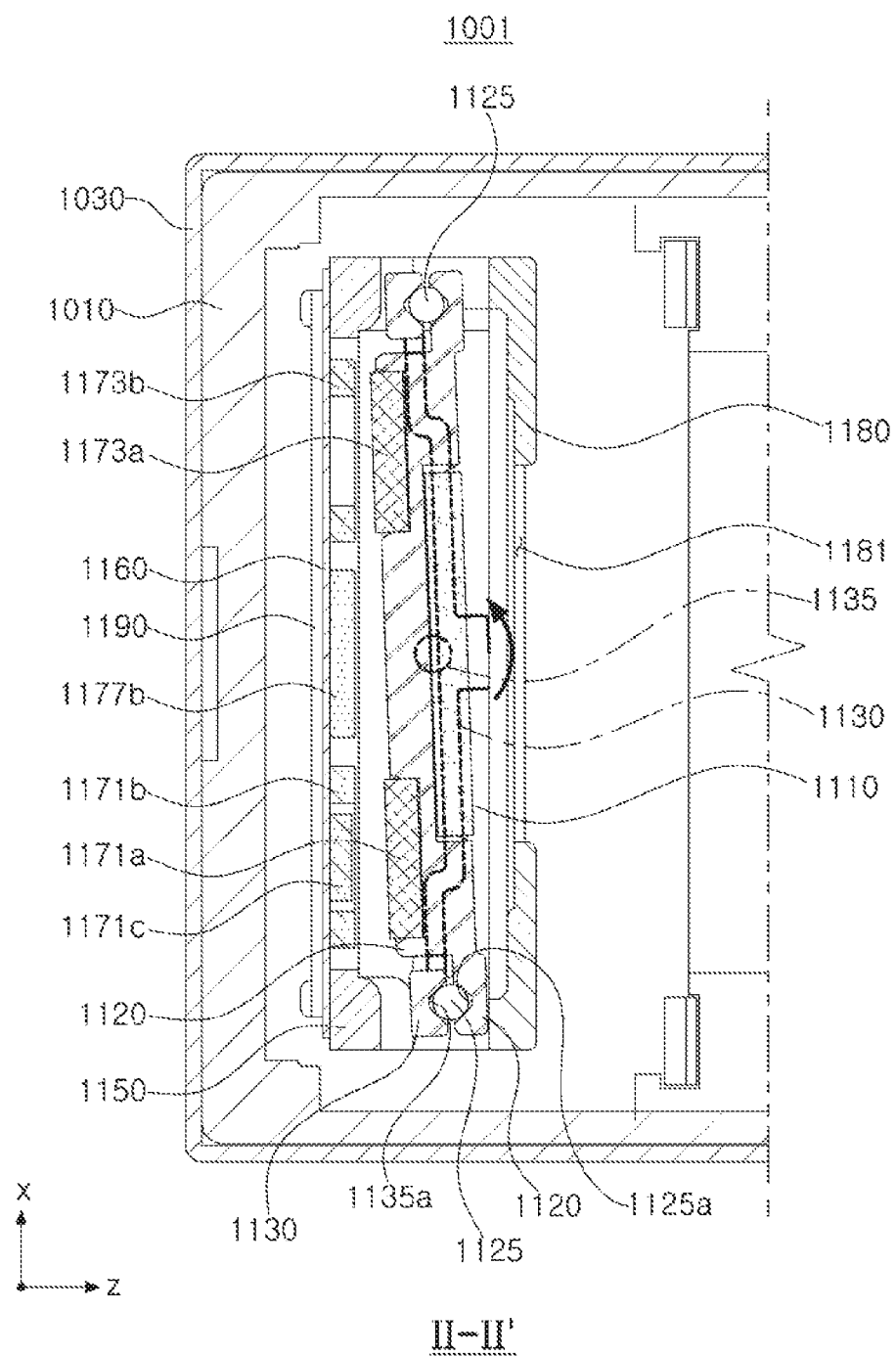
Figure 8A:
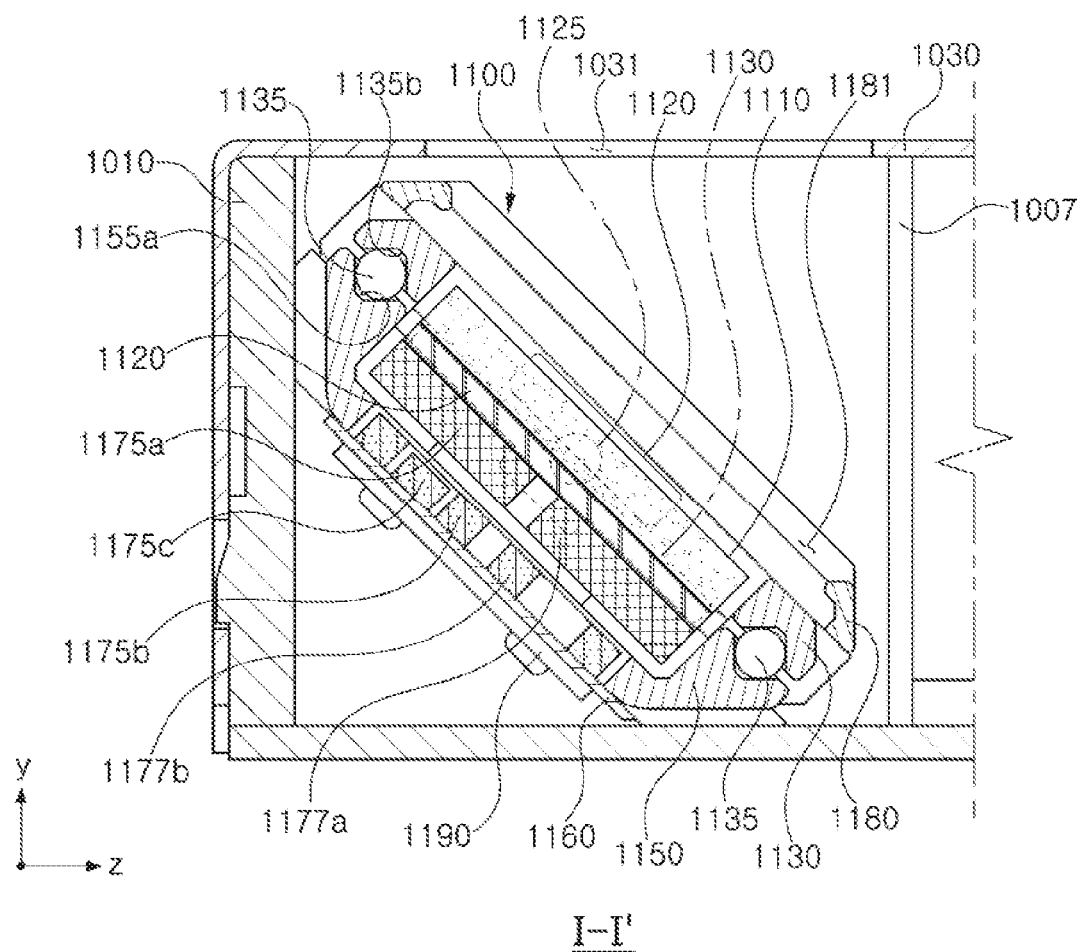
FIGS. 8A through 8C are schematic views illustrating a manner in which the rotation holder according to an embodiment is rotated around a second axis.
Figure 8B:
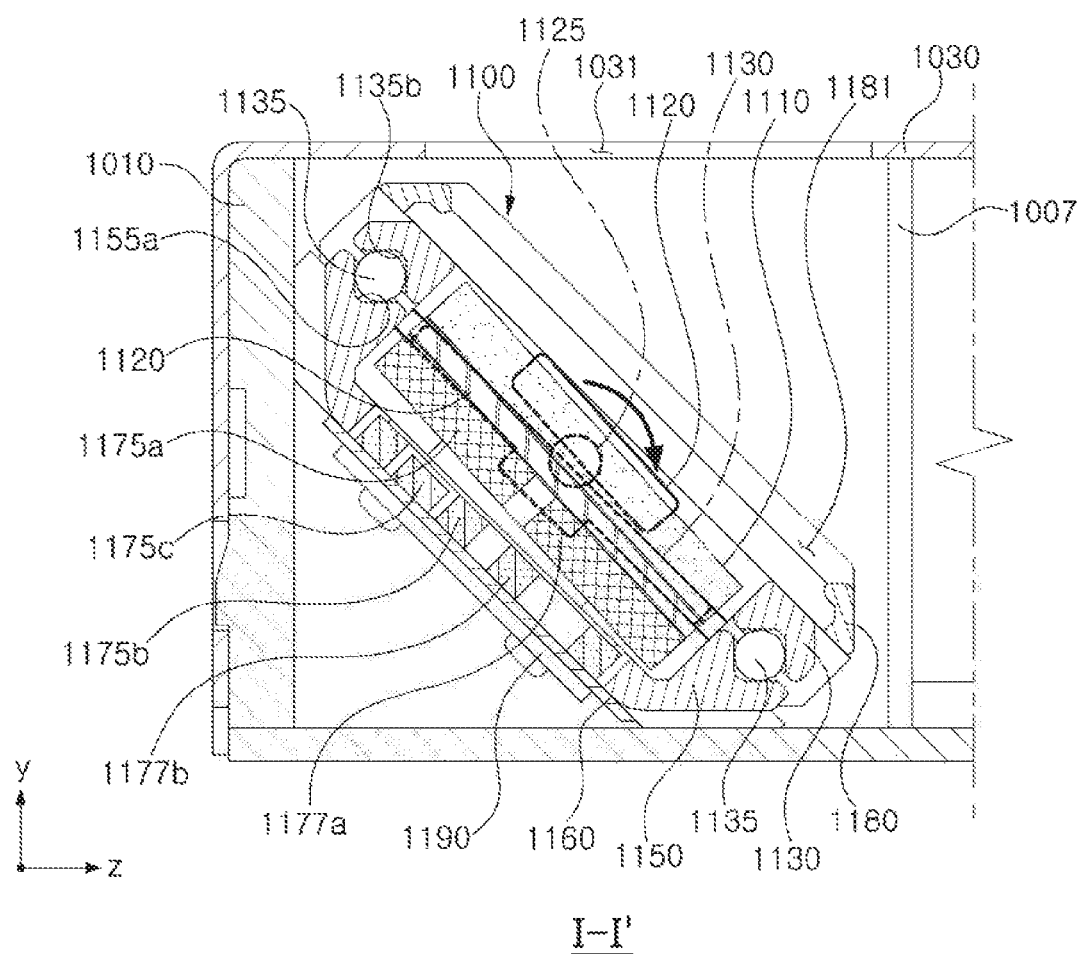
Figure 8C:
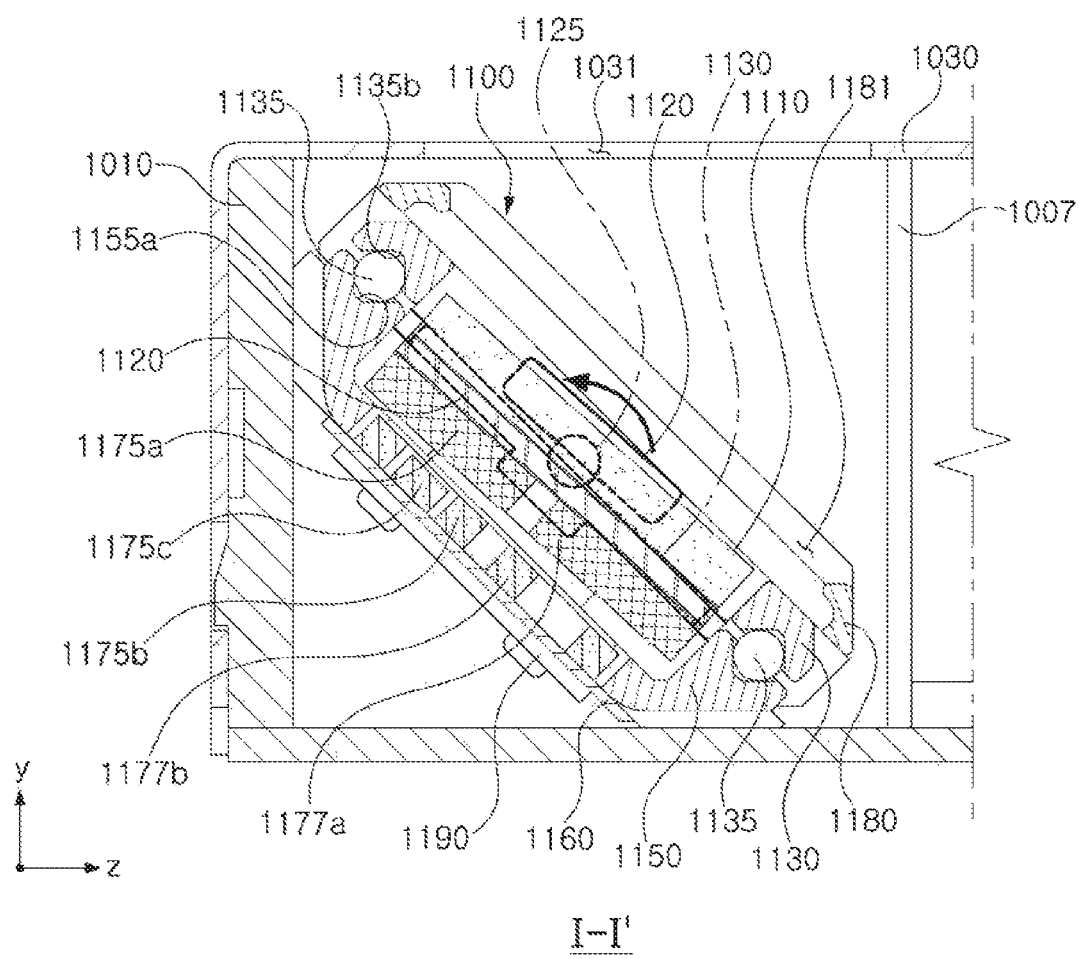

FIGS. 7A through 7C are schematic views illustrating a manner in which the rotation holder according to an embodiment is rotated around a first axis, and FIGS. 8A through 8C are schematic views illustrating a manner in which the rotation holder according to an embodiment is rotated around a second axis.

Referring to FIGS. 7A through 7C, when the rotation holder 1120 is rotated around the set of the ball bearings 1135 aligned in the first axis A1 direction, the magnets 1171*a* and 1173*a* and the coils 1171*b* and 1173*b* aligned in the second axis A2 direction perpendicular to the first axis A1 may become close to or distant from each other, respectively. That is, the rotation holder 1120 is moved so that an interval between the magnet 1173*a* and the coil 1173*b* on the right (on the drawings) of the first axis A1 is greater or smaller than that between the magnet 1171*a* and the coil 1171*b* on the left of the first axis A1. In addition, when the rotation holder 1120 is rotated around the first axis A1, the rotation holder 1120 is rotated together with the rotation frame 1130.

In addition, referring to FIGS. 8A through 8C, when the rotation holder 1120 is rotated around the set of the ball bearings 1125 aligned in the second axis A2 direction, the magnets 1175*a* and 1177*a* and the coils 1175*b* and 1177*b* aligned in the first axis A1 direction perpendicular to the second axis A2 become close to or distant from each other, respectively. That is, the rotation holder 1120 is moved so that an interval between the magnet 1175*a* and the coil 1175*b* on the left (on the drawings) of the second axis A2 is greater or smaller than that between the magnet 1177*a* and the coil 1177*b* on the right of the second axis A2. In addition, when the rotation holder 1120 is rotated around the second axis A2, the rotation frame 1130 is not rotated, and only the rotation holder 1120 is relatively rotated with respect to the rotation frame 1130.

Figure 9:
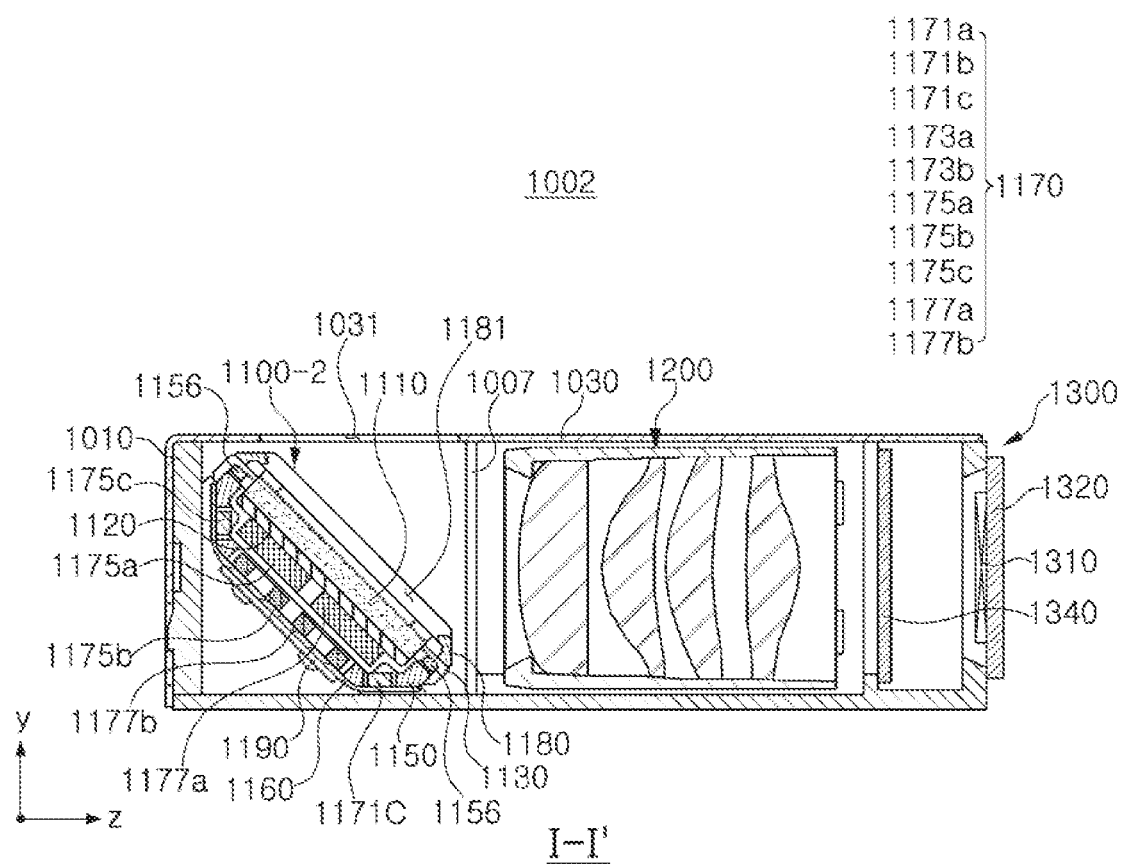
FIG. 9 is a cross-sectional view illustrating the camera module according to a an embodiment.
Figure 10:
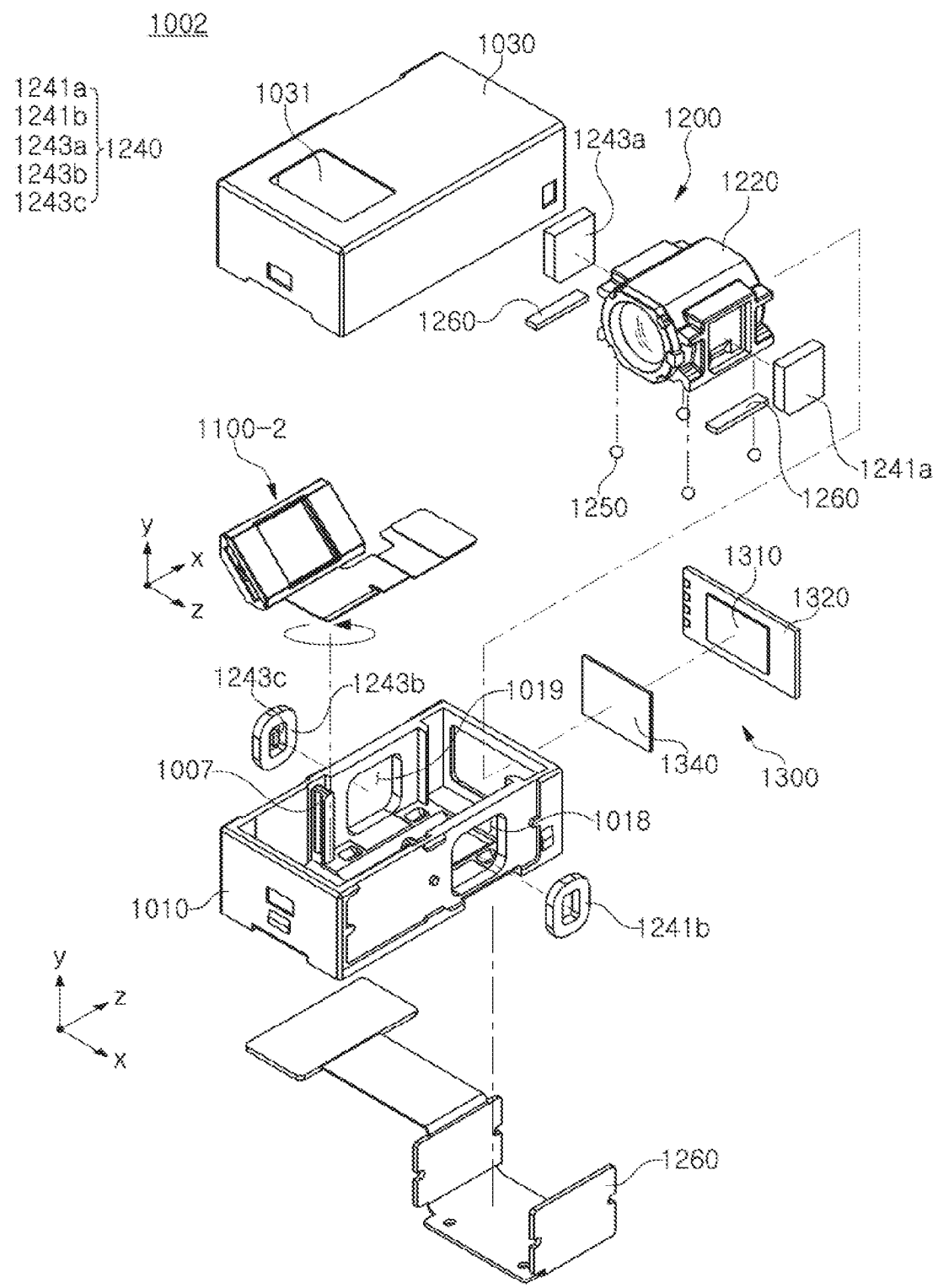
FIG. 10 is an exploded perspective view illustrating the camera module according to an embodiment.
Figure 11:
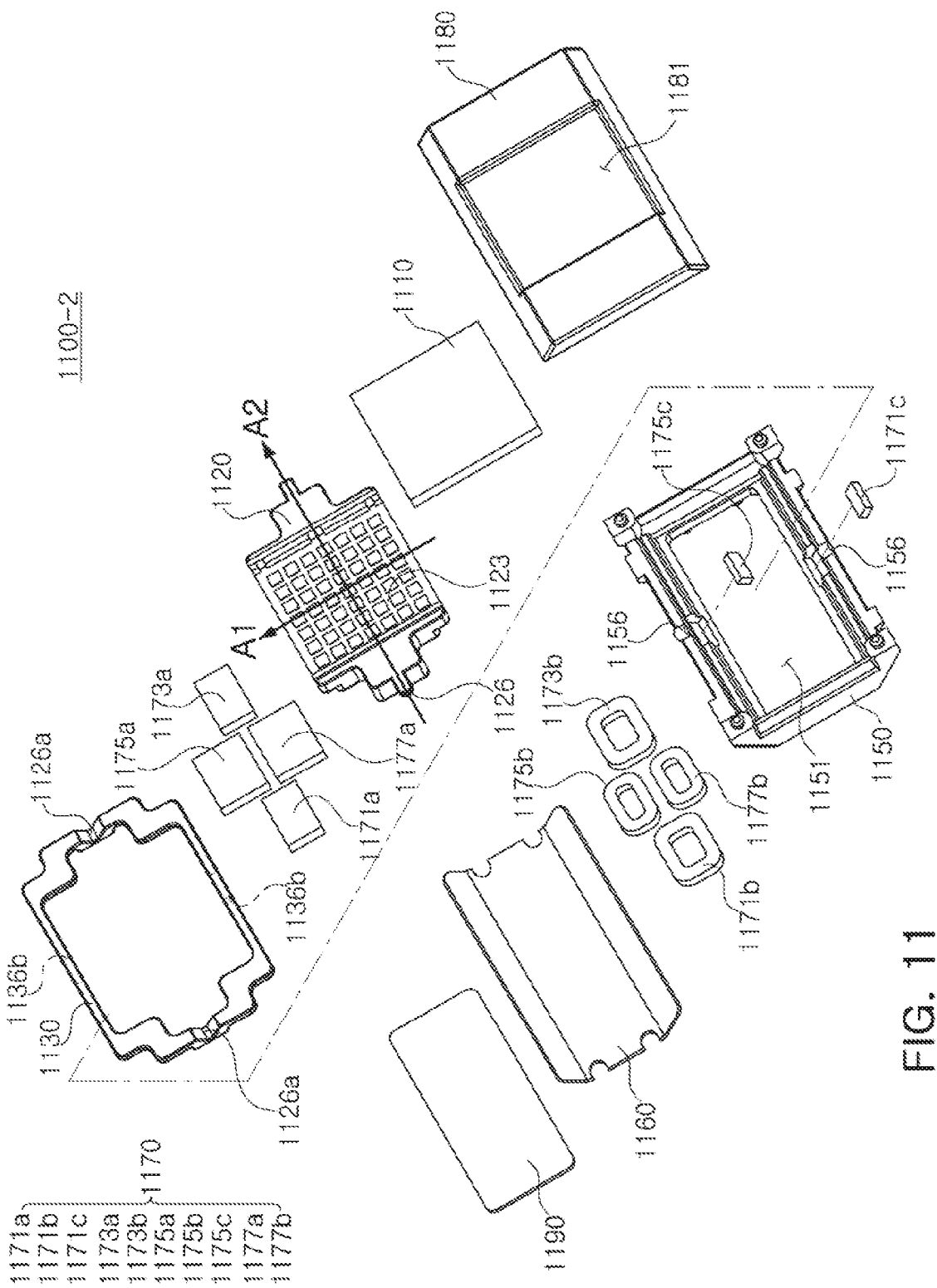
FIG. 11 is an exploded perspective view illustrating a reflecting module of the camera module according to an embodiment.
Figure 12:
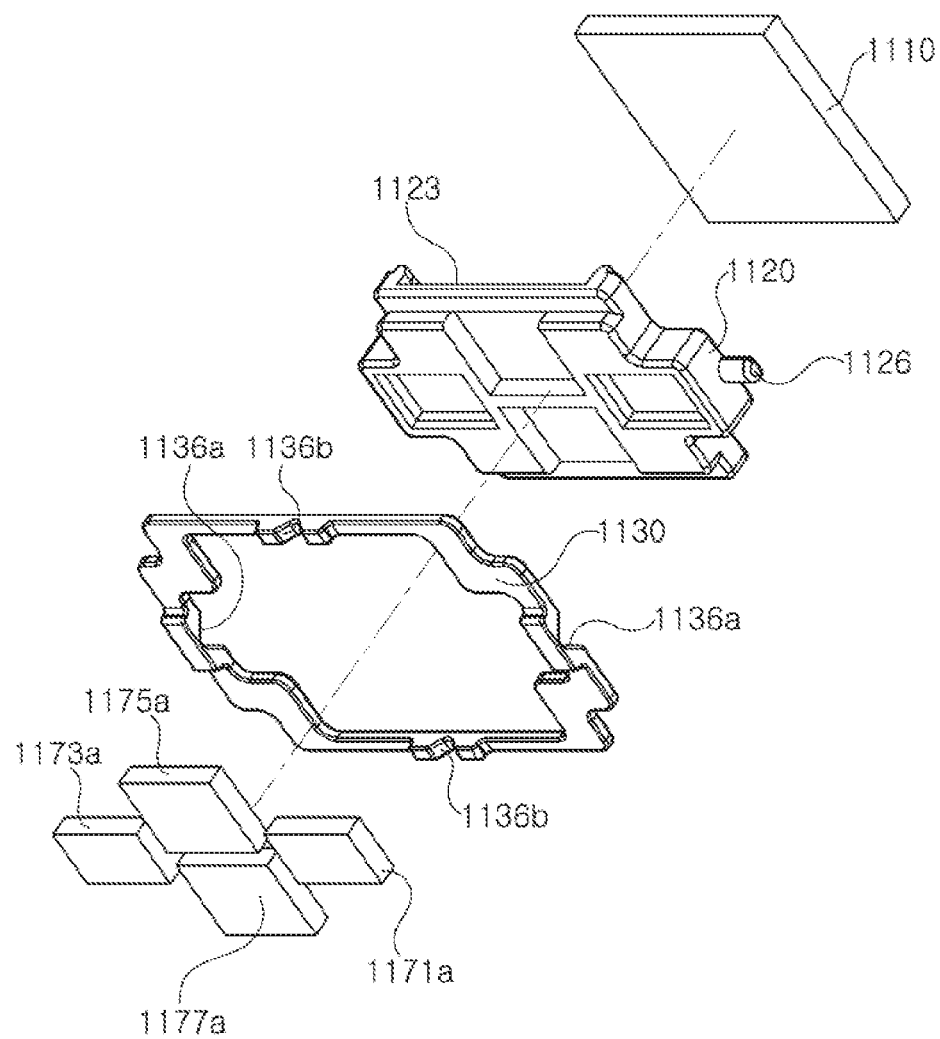
FIG. 12 is a bottom view illustrating a rotation frame and a rotation holder of the camera module according to an embodiment.

FIG. 9 is a cross-sectional view illustrating the camera module according to an embodiment, FIG. 10 is an exploded perspective view of the camera module according to an embodiment, FIG. 11 is an exploded perspective view of a reflecting module of the camera module according to an embodiment, and FIG. 12 is a bottom view of a rotation frame and a rotation holder of the camera module according to an embodiment.

Referring to FIGS. 9 through 12, all the components of the camera module 1002 according to an embodiment except for a reflecting module are the same as those of the camera module 1001 described above. Hereinafter, a configuration of the reflecting module will be described in detail below, and the same components will be denoted by the same reference numerals.

Basic components of the reflecting module 1100-2 according to an embodiment are the same as those of the reflecting module 1100, and the reflecting module 1100-2 according to an embodiment is different from the reflecting module 1100 in that ball bearings, which are bearings for relative rotation between the rotation frame 1130 and the rotation holder 1120 and between the rotation frame 1130 and the housing 1150, are fixed.

That is, in the reflecting module 1100-2, integral ball bearings 1126 are provided integrally with the rotation frame 1130 or the rotation holder 1120 in an edge of either one of the rotation frame 1130 and the rotation holder 1120, and seating grooves 1136*a* into which the integral ball bearings 1126 are rotatably inserted are provided in the edge of the other one of the rotation frame 1130 and the rotation holder 1120, in which the integral ball bearings 1126 are not provided. The ball bearings 1126 may be provided in any one of a spherical shape, a hemispherical shape, a semi-cylindrical shape, and a rounded protrusion shape, and cross-sections of the seating grooves 1136*a* may have a round shape or a poly-pyramidal shape.

In addition, in the reflecting module 1100-2, integral ball bearings 1156 are provided integrally with the rotation frame 1130 or the housing 1150 in an edge of the rotation frame 1130 or a sidewall of the housing 1150, and seating grooves 1136*b* into which the integral ball bearings 1156 are rotatably inserted are provided in the edge of the rotation frame 1130 or the sidewall of the housing 1150 in which the integral ball bearings 1156 are not provided. The integral ball bearings 1156 may be provided in any one of a spherical shape, a hemispherical shape, a semi-cylindrical shape, and a rounded protrusion shape, and cross-sections of the seating grooves 1136*b* may have a round shape or a poly-pyramidal shape.

Figure 13A:
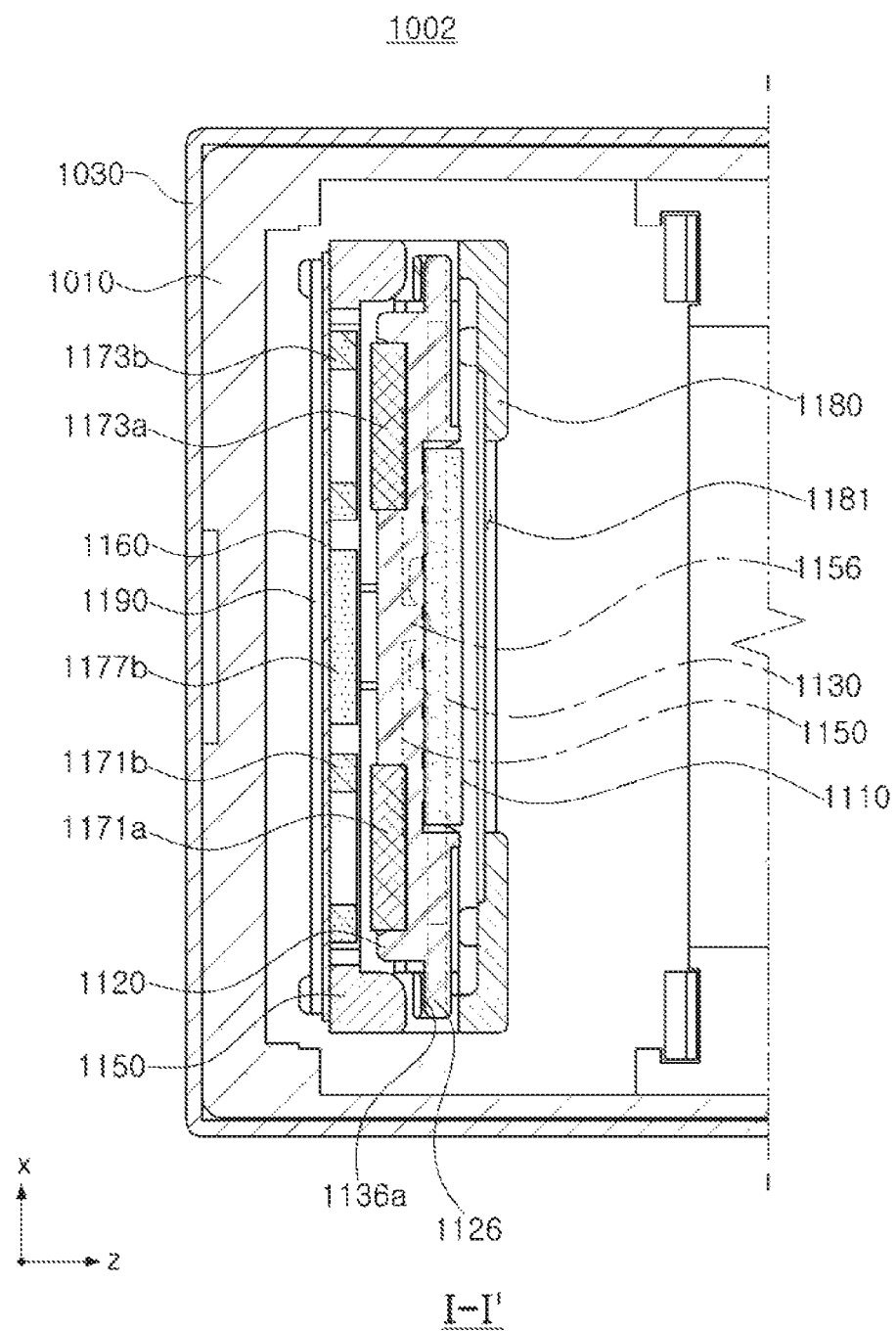
FIGS. 13A through 13C are schematic views illustrating a manner in which the rotation holder according to an embodiment is rotated around a first axis.
Figure 13B:
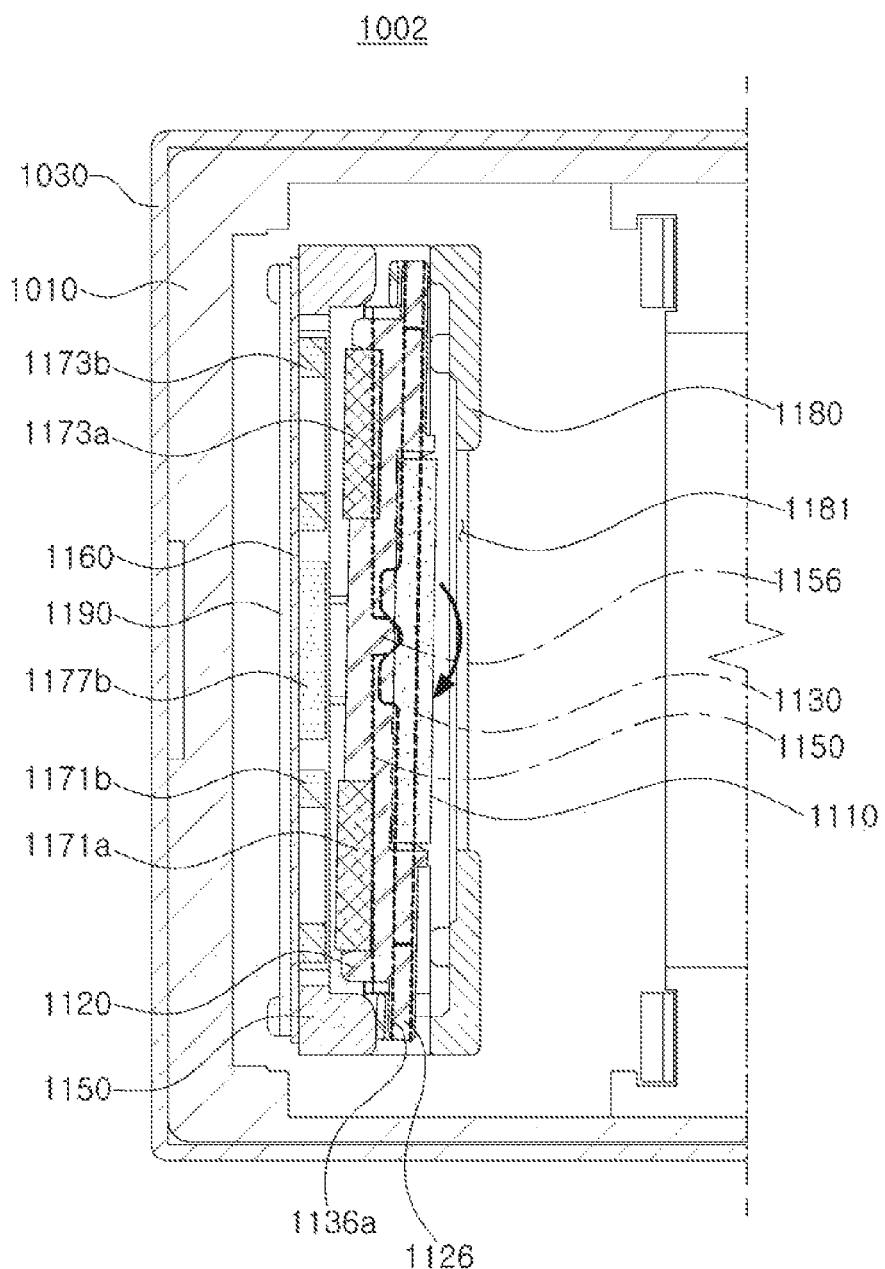
Figure 13C:
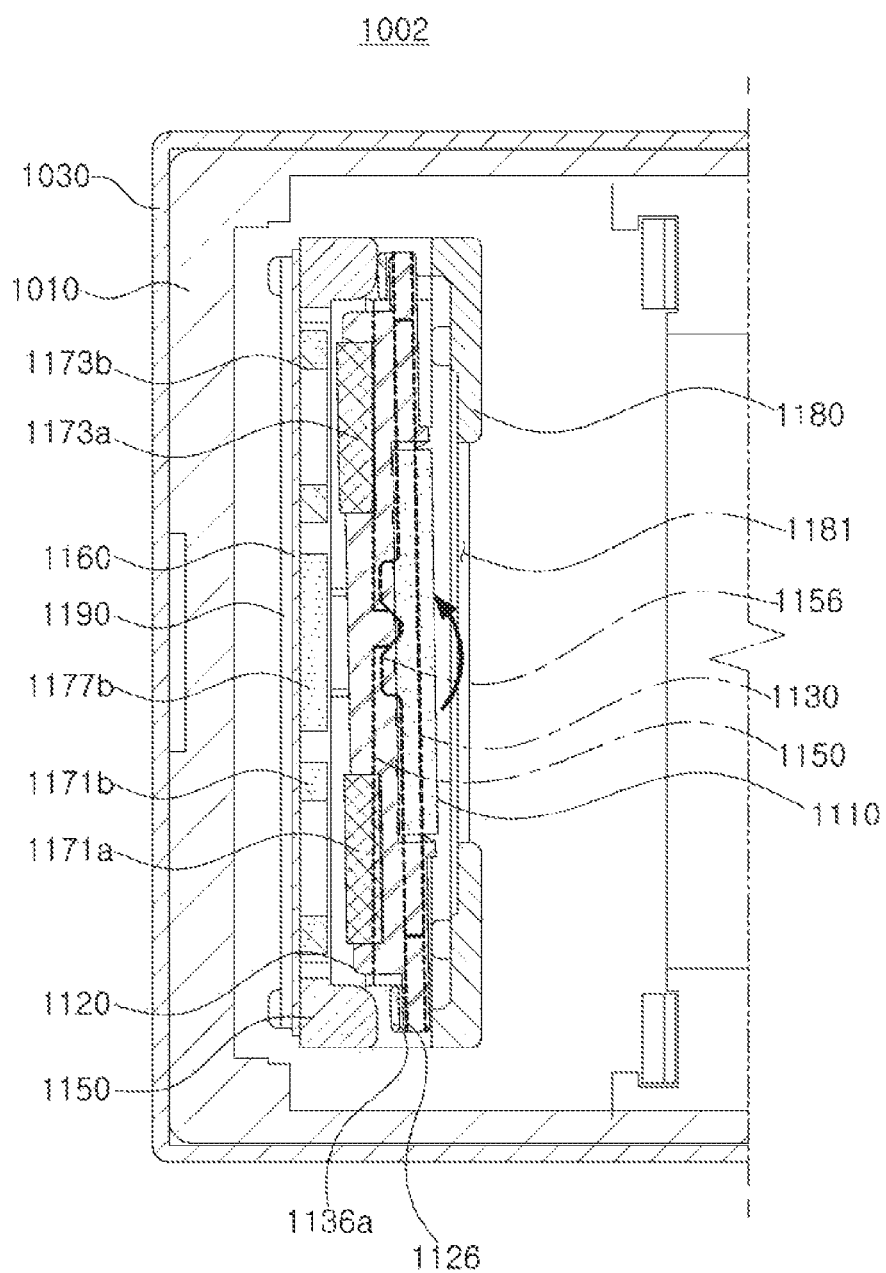
Figure 14A:
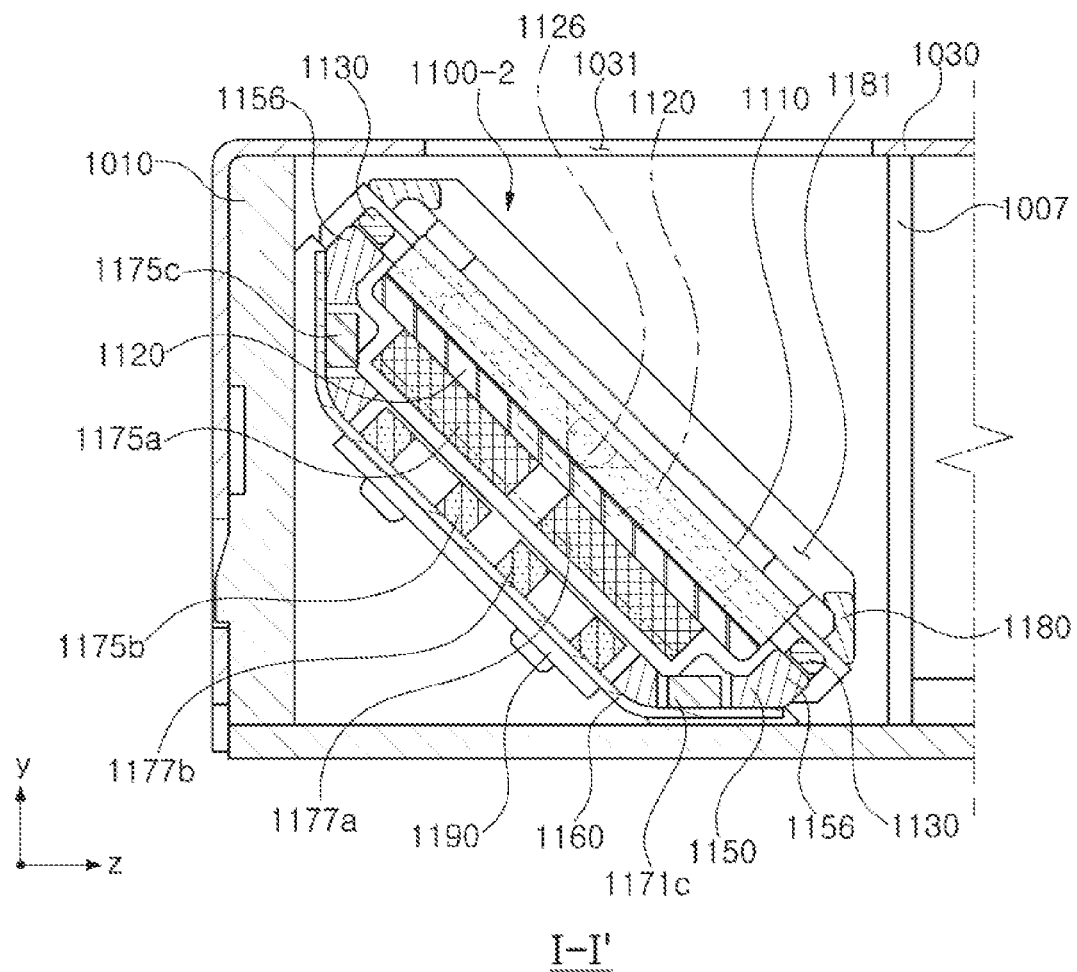
FIGS. 14A through 14C are schematic views illustrating a manner in which the rotation holder according to an embodiment is rotated around a second axis.
Figure 14B:
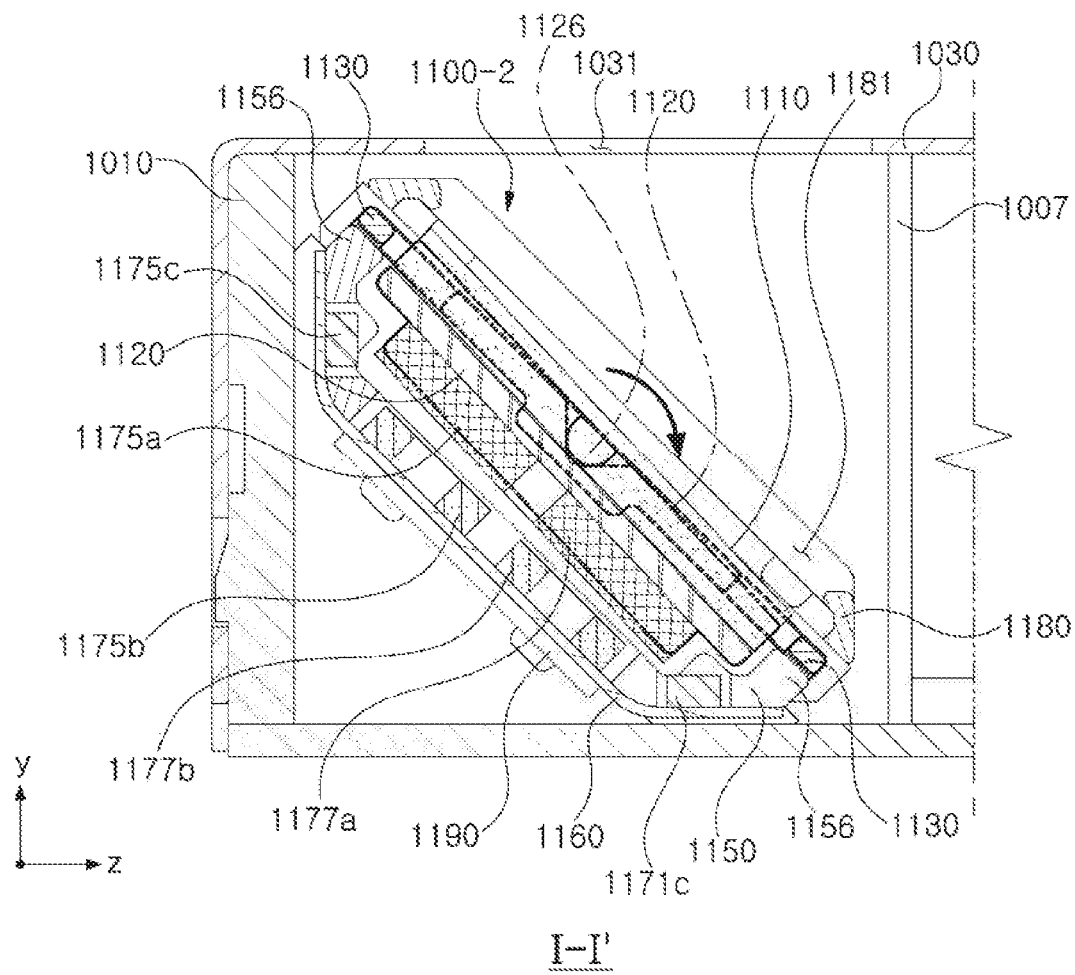
Figure 14C:
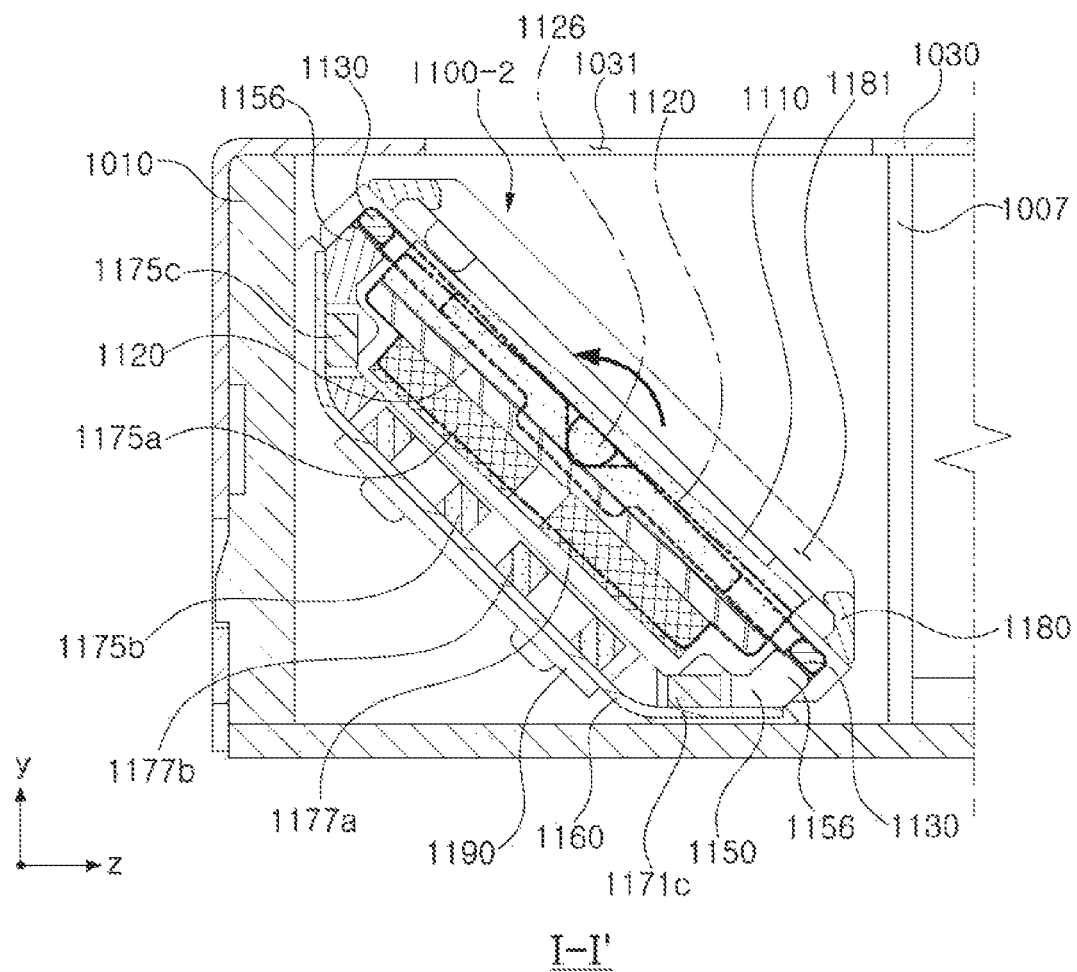

FIGS. 13A through 13C are schematic views illustrating a manner in which the rotation holder according to an embodiment is rotated around a first axis, and FIGS. 14A through 14C are schematic views illustrating a manner in which the rotation holder according to an embodiment is rotated around a second axis.

Referring to FIGS. 13A through 13C, when the rotation holder 1120 is rotated around the set of the ball bearings 1156 aligned in the first axis A1 direction, the magnets 1171*a* and 1173*a* and the coils 1171*b* and 1173*b* aligned in the second axis A2 direction perpendicular to the first axis A1 become close to or distant from each other, respectively. That is, the rotation holder 1120 is moved so that an interval between the magnet 1173*a* and the coil 1173*b* on the right (on the drawings) of the first axis A1 is greater or smaller than that between the magnet 1171*a* and the coil 1171*b* on the left of the first axis A1.

In addition, referring to FIGS. 14A through 14C, when the rotation holder 1120 is rotated around the set of the ball bearings 1126 aligned in the second axis A2 direction, the magnets 1175*a* and 1177*a* and the coils 1175*b* and 1177*b* aligned in the first axis A1 direction perpendicular to the second axis A2 become close to or distant from each other, respectively. That is, the rotation holder 1120 is moved so that an interval between the magnet 1175*a* and the coil 1175*b* on the left (on the drawings) of the second axis A2 is greater or smaller than that between the magnet 1177*a* and the coil 1177*b* on the right of the second axis A2.

Figure 15:
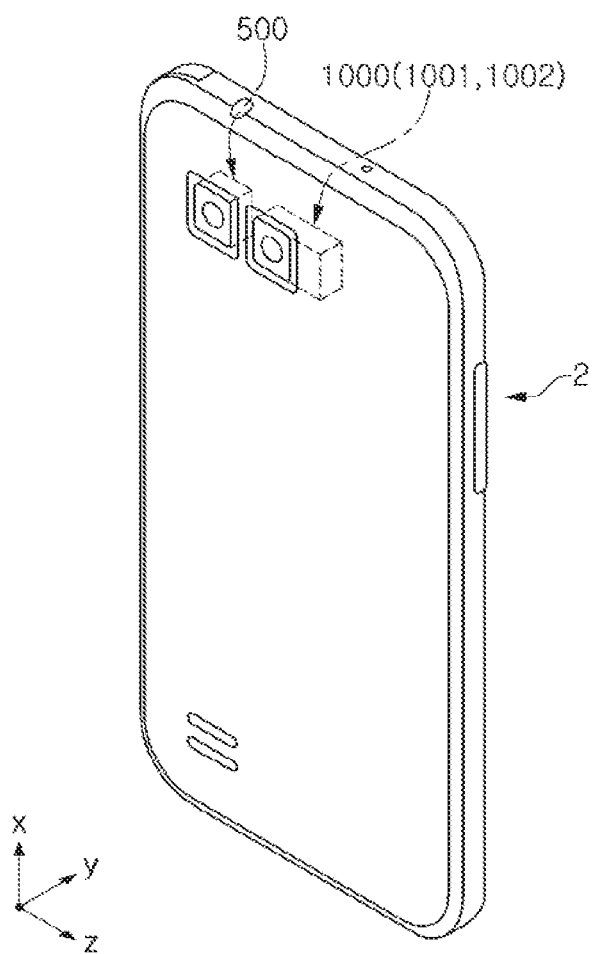
FIG. 15 is a perspective view illustrating a portable electronic device according to an embodiment in the present disclosure.

FIG. 15 is a perspective view of a portable electronic device according to an embodiment.

Referring to FIG. 15, a portable electronic device 2 according to an embodiment may be a portable electronic device such as a mobile communications terminal, a smartphone, a tablet personal computer (PC), or the like, in which a plurality of camera modules 500 and 1000 are mounted.

One or more of the camera modules 500 and 1000 is the camera module 1000: 1001 or 1002 according to the embodiments described with reference to FIGS. 2 through 14C.

That is, a portable electronic device including a dual camera module may include the camera module 1000: 1001 or 1002 according to the embodiments as at least one of two camera modules.

As set forth above, the camera module and the portable electronic device including the same according to the exemplary embodiment of the present disclosure has a simple structure and a reduced size while implementing the auto-focusing function, the zoom function, and the OIS function. In addition, power conduction is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
 a lens module comprising lenses; and
 a reflecting module configured to change a path of incident light so that the light is directed toward the lens module, the reflecting module comprising:
  a housing;
  a rotation holder supported by a sidewall of the housing through a rotation frame;
  a reflecting member disposed on the rotation holder;
  a driving part configured to provide driving force to the rotation holder such that the rotation holder is moved relative to the housing; and
  a pulling yoke disposed in the housing so that the rotation holder is supported by the sidewall of the housing by attractive force between the pulling yoke and a magnet, the pulling yoke facing the magnet in a direction perpendicular to a reflecting surface of the reflecting member.

2. The camera module of claim 1, wherein the rotation frame is rotatable around one axis parallel to the reflecting surface of the reflecting member with respect to the housing, and
 the rotation holder is rotatable around an other axis parallel to the reflecting surface of the reflecting member and approximately perpendicular to the one axis with respect to the rotation frame.

3. The camera module of claim 2, wherein the rotation frame is moved together with the rotation holder when the rotation frame is rotated around the one axis, and
 the rotation holder is rotated relative to the rotation frame when the rotation holder is rotated around the other axis.

4. The camera module of claim 2, wherein the rotation frame surrounds an edge of the rotation holder, and
 the rotation holder is partially disposed on an edge of the rotation frame and is rotatable within the rotation frame.

5. The camera module of claim 2, wherein a set of ball bearings aligned in the one axis direction is disposed between an edge of the rotation frame and the sidewall of the housing.

6. The camera module of claim 5, wherein seating grooves into which the ball bearings are inserted are disposed between the edge of the rotation frame and the sidewall of the housing.

7. The camera module of claim 5, wherein the ball bearings are integral ball bearings provided integral with either one of the rotation frame, in the edge of the rotation frame, and the housing, in the sidewall of the housing, and
 seating grooves into which the integral ball bearings are disposed are provided in the edge of one of the rotation frame and the sidewall of the housing in which the ball bearings are not provided.

8. The camera module of claim 7, wherein the integral ball bearings comprise any one of a spherical shape, a hemispherical shape, a semi-cylindrical shape, and a rounded protrusion shape.

9. The camera module of claim 8, wherein the seating grooves provided in the edge of the rotation frame or the sidewall of the housing have a round shape or a poly-pyramidal shape.

10. The camera module of claim 2, wherein a set of ball bearings aligned in the other axis direction is disposed between the rotation holder and an edge of the rotation frame.

11. The camera module of claim 10, wherein seating grooves into which the ball bearings are inserted are disposed between the rotation holder and the edge of the rotation frame.

12. The camera module of claim 10, wherein the ball bearings are integral ball bearings provided integral with either one of the rotation holder, in an edge of the rotation holder, and the rotation frame, in an edge of the rotation frame, and
 seating grooves into which the integral ball bearings are inserted are provided in one of the edge of the rotation holder and the rotation frame in which the ball bearings are not provided.

13. The camera module of claim 12, wherein the integral ball bearings comprise any one of a spherical shape, a hemispherical shape, a semi-cylindrical shape, and a rounded protrusion shape.

14. The camera module of claim 13, wherein the seating grooves provided in the edge of the rotation holder or the rotation frame have a round shape or a poly-pyramidal shape.

15. The camera module of claim 1, wherein an optical axis of the lenses is generally perpendicular to a direction of the incident light to the camera module.

16. A portable electronic device comprising:
 a camera module comprising a lens module and a reflecting module configured to change a path of incident light so that the light is directed toward the lens module, the reflecting module comprising:
- a housing;
- a rotation holder supported by a sidewall of the housing through a rotation frame;
- a reflecting member disposed on the rotation holder;
- a driving part configured to provide driving force to the rotation holder such that the rotation holder is moved relative to the housing; and
- a pulling yoke disposed in the housing so that the rotation holder is supported by the sidewall of the housing by attractive force between the pulling yoke and a magnet disposed on a lower surface of the rotation holder, the pulling yoke facing the magnet in a direction perpendicular to a reflecting surface of the reflecting member.

17. A reflecting module configured to change a path of incident light so that the light is directed toward an optical axis of a lens module comprising lenses, the reflecting module comprising:
- a housing;
- a rotation holder supported by a sidewall of the housing through a rotation frame;
- a reflecting member disposed on the rotation holder;
- a driving part configured to provide driving force to the rotation holder such that the rotation holder is moved relative to the housing; and
- a first magnet member disposed in the housing so that the rotation holder is supported by the sidewall of the housing by attractive force between the first magnet member and a second magnet member, the first magnet member facing the second magnet member in a direction perpendicular to a reflecting surface of the reflecting member.

18. The reflecting module of claim 17, wherein the rotation frame is rotatable around one axis parallel to the reflecting surface of the reflecting member with respect to the housing, and
the rotation holder is rotatable around an other axis parallel to the reflecting surface of the reflecting member and approximately perpendicular to the one axis with respect to the rotation frame.

19. The reflecting module of claim 18, wherein the rotation frame is moved together with the rotation holder when the rotation frame is rotated around the one axis, and
the rotation holder is rotated relative to the rotation frame when the rotation holder is rotated around the other axis.

20. The camera module of claim 18, wherein the rotation frame surrounds an edge of the rotation holder, and
the rotation holder is partially disposed on an edge of the rotation frame and is rotatable within the rotation frame.

* * * * *